(12) United States Patent
Fujita et al.

(10) Patent No.: US 8,144,012 B2
(45) Date of Patent: Mar. 27, 2012

(54) CABLE INSTALLATION SUPPORT SYSTEM, TERMINAL BLOCK PLATE AND CABLE INSTALLATION SUPPORT METHOD

(75) Inventors: Hirotaka Fujita, Tokyo (JP); Sozo Sakata, Tokyo (JP); Kou Fukui, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 805 days.

(21) Appl. No.: 12/238,851

(22) Filed: Sep. 26, 2008

(65) Prior Publication Data
US 2009/0085722 A1 Apr. 2, 2009

(30) Foreign Application Priority Data
Oct. 2, 2007 (JP) .................................. 2007-258827

(51) Int. Cl.
*G08B 13/14* (2006.01)
(52) U.S. Cl. ..................................... 340/572.1; 340/687
(58) Field of Classification Search ................ 340/10.1, 340/8.1, 572.1, 686.1, 687
See application file for complete search history.

(56) References Cited

U.S. PATENT DOCUMENTS

| | | |
|---|---|---|
| 2007/0102505 A1 | 5/2007 | Yokota et al. |
| 2007/0178742 A1* | 8/2007 | Shigemi et al. ............... 439/394 |
| 2008/0273844 A1* | 11/2008 | Kewitsch ................... 340/572.1 |

* cited by examiner

*Primary Examiner* — Thomas Mullen
(74) *Attorney, Agent, or Firm* — Roberts Mlotkowski Safran & Cole, P.C.; David S. Safran

(57) ABSTRACT

A cable installation support system capable of saving the labor of, and speeding up, work and check work while eliminating human error has terminals with a fixed pitch, and a terminal block cover having RFIDs with the same pitch as the pitch of the terminals of the terminal block. A terminal is provided with an R FID reader that reads identification information stored in the RFIDs. Also, in the terminal, identification information in RFID tags attached to core wires of a cable and terminals to which the core wires are attached are associated with each other, and predetermined RFIDs attached to the terminal block cover and the respective terminals of the terminal block are associated with each other. When an RFID tag and an RFID in the terminal block cover are read by the RFID reader, the terminal determines whether or not the core wire is connected to a correct terminal.

7 Claims, 22 Drawing Sheets

TERMINAL BLOCK COVER 40
TERMINAL BLOCK 21

TERMINAL BLOCK 21

21b    21a
40b    40a

TERMINAL BLOCK COVER 40    RFID

MATCHING BETWEEN RFID MANUFACTURING NUMBERS AND CABLE INFORMATION

READ CABLE No. AND NUMBER OF CORE WIRES, AND MANUFACTURING NUMBERS VIA READER AND LINK READ CABLE No. AND NUMBER OF CORE WIRES, AND MANUFACTURING NUMBERS WITH EACH OTHER

PERSONAL COMPUTER13   PRINTER

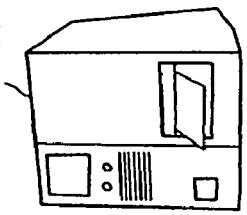
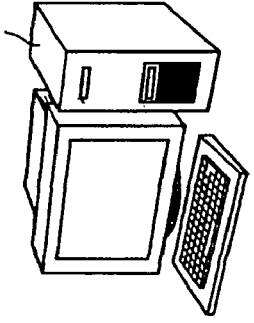

CABLE No. ↑
RFID UNIQUE ID ↓

| RFID MANUFACTURING NUMBER | CABLE INFORMATION |
|---|---|
| 33010021 | XXXXXXX XXXX XXXXXXX XXX |

LINKAGE

FIG.5A

ATTACHMENT OF RFID-EQUIPPED INDEX SEAL

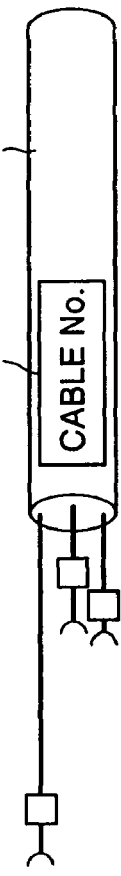

31
31a
CABLE No.

FIG.5B

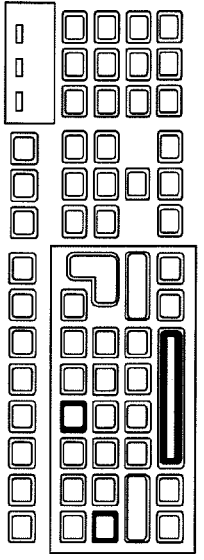

FIG.11A
CABLE LAYING WORK
(TRAY ROUTE SELECTION)

(A) LAYING WORK SCREEN

| LAYING WORK | WORKER : XXX XX | 14 : 49 |
|---|---|---|

CABLE No. : XXXXX
DESIGNED LENGTH : 145
WIRE TYPE : XXXX
NUMBER OF WIRES : 7P  SIZE : 1.30
SPECIFICATION CODE: XXXXXX
DATE OF LAYING : OCTOBER 11, 2006 ▽

REGISTER   CANCEL

A

FIG.11B
(B) EXAMPLE OF WIRING TABLE DISPLAY

FILE(F)  EDIT(E)  DISPLAY(V)
⇐BACK▽⇨  ⊗  ◻  ⌂

XX%          SEARCH

XXXXXXX        ×       ×
XXX-XXXX-XX   XXXX
XXX-XX-XXXX   XXXX
XX-XX(XX)     7P      1.3
145
ABCDEF01  ABCDEF11  ABCDEF21  ABCDEF31
BCDEFG02  BCDEFG12  BCDEFG22  BCDEFG32
CDEFGH03  CDEFGH13  CDEFGH23  CDEFGH33
DEFGHI04  DEFGHI14  DEFGHI24  DEFGHI34
EFGHIJ05  EFGHIJ15  EFGHIJ25  EFGHIJ35

↓  ↑

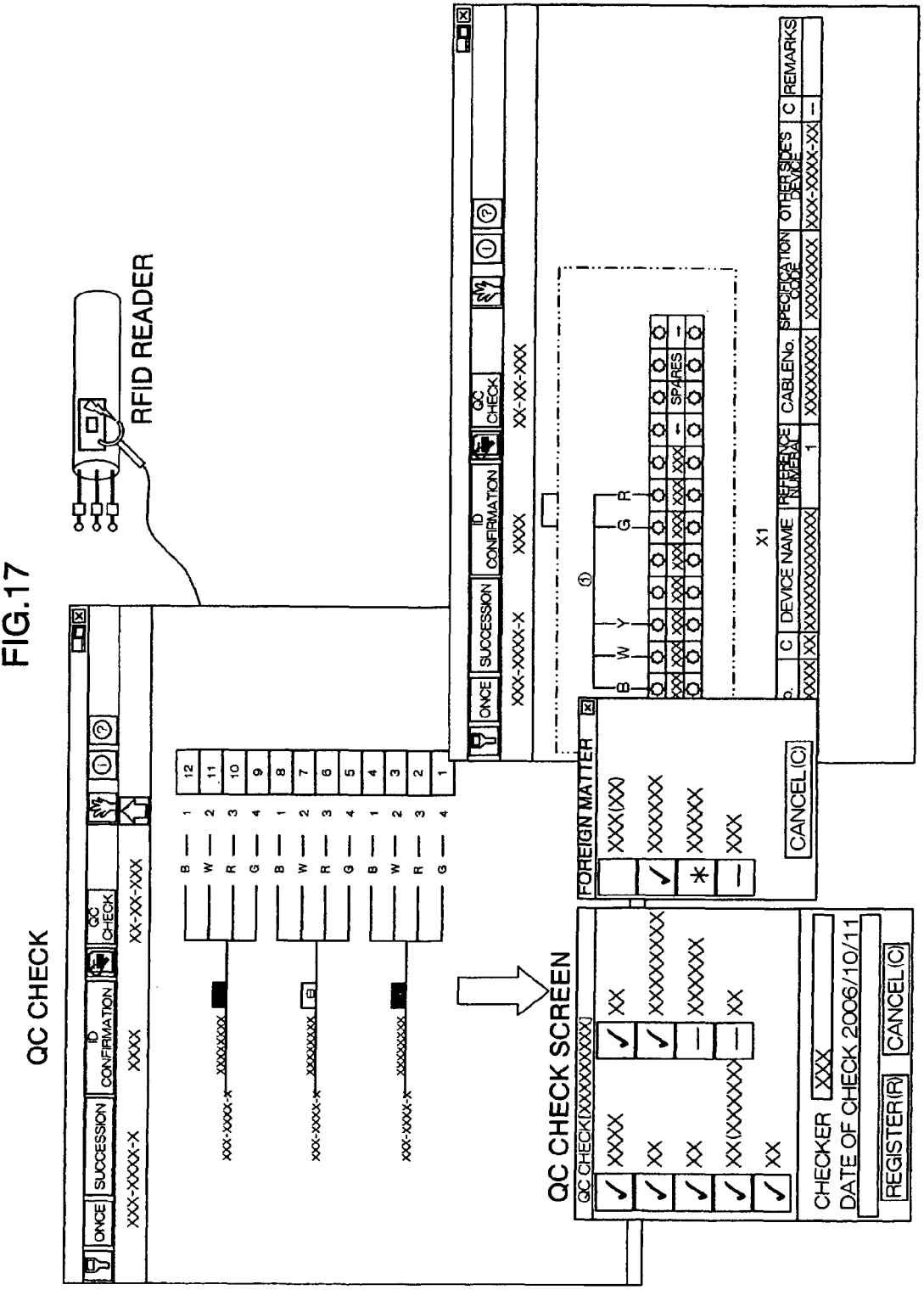

CABLE INSTALLATION SUPPORT SYSTEM, TERMINAL BLOCK PLATE AND CABLE INSTALLATION SUPPORT METHOD

BACKGROUND OF THE INVENTION

1. Field of the Invention

The present invention relates to a cable installation support system, a terminal block plate and a cable installation support method, and specifically relates to a cable installation support system, a terminal block plate and a cable installation support method, which support electric cable laying work in, e.g., a large plant.

2. Description of the Related Art

The flow of conventional cable installation will be described. The laying route, cable length, cable size, cable type, etc., are selected based on wiring design information to procure the cables. Subsequently, while viewing a connection diagram prepared based on a sequence diagram, cable ends are processed (coating removal and terminal attachment), and the cables after the processing are connected to terminal blocks.

After connecting the cables to the terminal blocks, a worker confirms that the connections are made at the positions as shown in the drawing and ticks off a check sheet. Also, a manager checks the connected wirings against the connection drawing and confirms that the work has been done correctly, and then puts his/her signature on the check sheet to indicate that the manager's check has been done.

Also, Japanese Patent Application Laid-Open No. 2007-151383 discloses an RFID system in which RFIDs are attached to a cable, circuit information is acquired from the IDs of the RFIDs, and LEDs attached to terminals to be connected to the cable are made to emit light, thereby helping installation, removal and check of the cable.

In a conventional cable installation method, since both a connection drawing and a check sheet are used, the appropriateness of the work cannot be confirmed only by either one of them alone, and also, since the connection drawing and the check sheet are of paper, it is hard to manage the check records. Also, it is difficult to computerize the check records, and it is thus difficult to make a search from the recorded information when confirming the work at a later date.

Also, during the work, the connection drawing, etc. are frequently changed, and accordingly, when the work is conducted using paper information, it is difficult to confirm whether or not the content of the connection drawing, etc., used for cable connection work or check work is the latest information, which easily results in human error. Furthermore, the cable connection is confirmed visually, which may result in overlooking connection errors.

Meanwhile, in the technique disclosed in Japanese Patent Application Laid-Open No. 2007-151383, it is necessary to attach a member for check such as an LED to each terminal, but in a large plant such as a power plant, a great number of terminal blocks each provided with a plurality of terminals are used, and accordingly, a member for check should be attached to each terminal.

SUMMARY OF THE INVENTION

The present invention has been made in view of the circumstances mentioned above, and an object of the present invention is to provide a cable installation support system capable of saving the labor of, and speeding up, the work and check work, while eliminating human error.

In order to achieve the above object, a cable installation support system according to a first aspect of the present invention comprises: a cable including cable core wires with first RFIDs attached to ends of the respective cable core wires; a terminal block plate attachable/detachable to/from a terminal block to which the cable is connected, the terminal block plate being provided with second RFIDs at positions corresponding to respective terminals of the terminal block; and a portable terminal carried by a worker, wherein the portable terminal includes: an RFID reader that reads identification information from the first RFIDs and the second RFIDs, respectively; a determination device that determines, based on identification information read by the RFID reader from the first RFID attached to a cable core wire, and identification information read by the RFID reader from the second RFID attached to the position corresponding to the terminal of the terminal block to which the cable core wire is connected, whether or not the cable core wire is connected to a corresponding terminal of the terminal block; and a transmitting device that transmits the result of the determination by the determination device to an operator.

In the cable installation support system according to the first aspect of the present invention, the identification information of the second RFIDs being provided at the positions corresponding to the terminals to which the core wires are connected is read by the RFID reader, and whether or not a cable core wire is connected to a corresponding terminal in the terminal block is determined based on the identification information. Consequently, whether or not the core wires are correctly connected can easily and correctly be checked. Also, since the connections are checked using the RFIDs, reliability can be enhanced compared to the case where the connections are checked only visually.

A cable installation support system according to a second aspect of the present invention provides the cable installation support system according to the first aspect, wherein a third RFID is attached to the terminal block; the RFID reader reads identification information in the third RFID, and identification information in an intended second RFID from among the second RFIDs attached to the terminal block plate; and the determination device determines whether or not the terminal block plate matches the terminal block, based on the identification information in the third RFID and the second RFID read by the RFID reader.

In the cable installation support system according to the second aspect, whether or not the terminal block plate matches the terminal block is determined based on the identification information in the third RFIDs attached to the terminal block and the identification information in the intended RFID from among the second RFIDs attached to the terminal block plate. Consequently, whether or not the terminal block plate matches the terminal block can be checked, and attachment of the terminal block plate to an unmatched terminal block and checking cable connections using a terminal block plate not matching the terminal block can be prevented. For the third RFIDs, an intended second RFID from among the RFIDs (the second RFIDs) used for determining whether or not the cable core wires are connected to the designated terminals may be used, or a third RFID may also separately be provided for check of match with the terminal block.

A cable installation support system according to a third aspect of the present invention provides the cable installation support system according to the first or second aspect, wherein the portable terminal further includes a storage device that stores information in which the first RFIDs and the second RFIDs are associated with each other; and the determination device determines whether or not the cable core wire is connected to the corresponding terminal of the terminal block, based on the identification information in the first RFID and the second RFID read by the RFID reader and the information stored in the storage device.

In the invention according to the third aspect, information in which the first RFIDs and the second RFIDs are associated with each other is stored in advance, and whether or not a cable is connected to the designated terminals is determined by reading the identification information in the first RFIDs and the second RFIDs attached to the positions corresponding to the terminals to which the core wire with the first RFID attached thereto is connected. Consequently, the connection between the core wires and the terminal block can automatically and correctly be confirmed.

A terminal block plate according to a fourth aspect of the present invention is included in the cable installation support system according to any of the first to third aspects.

A terminal block plate according to a fifth aspect of the present invention provides the terminal block plate according to the fourth aspect, further comprising: a link mechanism including a plurality of lazy tongs or pantograph-like members in sequence; and the second RFIDs attached to a plurality of supports in the link mechanism, wherein a pitch for the second RFIDs is adjustable to conform to a pitch for the terminals of the terminal block.

In the terminal block plate according to the fifth aspect of the present invention, by means of a link mechanism including a plurality of lazy tongs or pantograph-like members in sequence, the pitch of the second RFIDs attached to the plurality of supports in the link mechanism is adjusted. Consequently, a pitch for RFIDs can be adjusted. Also, one type of terminal block plate can be applied also for plural types of terminal blocks with different terminal pitches.

A terminal block plate according to a six aspect of the present invention provides the terminal block plate according to the fourth or fifth aspect, wherein the terminal block plate includes a resin.

A cable installation support method according to a seventh aspect of the present invention comprises the steps of: attaching first RFIDs to ends of respective cable core wires of a cable; connecting the respective cable core wires of the cable to respective terminals of a terminal block; after the completion of the cable connection, attaching a terminal block plate with second RFIDs attached to the terminal block plate, the second RFIDs corresponding one by one to the terminals of the terminal block, to the terminal block; after the attachment of the terminal block plate, reading identification information from the first RFID attached to a cable core wire and the second RFID in the terminal block plate corresponding to the first RFID, respectively; based on the read identification information in the first RFID and the read identification information in the second RFID, determining whether or not the cable core wire is connected to a corresponding terminal of the terminal block; and outputting the result of the determination to an output device.

The present invention enables laborsaving and speed-up of respective work and check work while eliminating human error.

BRIEF DESCRIPTION OF THE DRAWINGS

FIGS. 5A and 5B are diagrams used to describe an association between RFID cable indexes and cable information;

FIGS. 10A and 10B are diagrams illustrating a cable cutting work screen displayed on the work terminal 11;

FIGS. 11A and 11B are diagrams illustrating a cable laying work screen displayed on the work terminal 11;

FIG. 17 is a diagram illustrating a cable connection work screen and a QC checking screen displayed on the work terminal 11 during QC check;

DETAILED DESCRIPTION OF THE PREFERRED EMBODIMENTS

Hereinafter, preferred embodiments of a cable installation support system according to the present invention will be described with reference to the accompanying drawings.

First Embodiment

<Schematic Configuration of the System>

Figure 1:
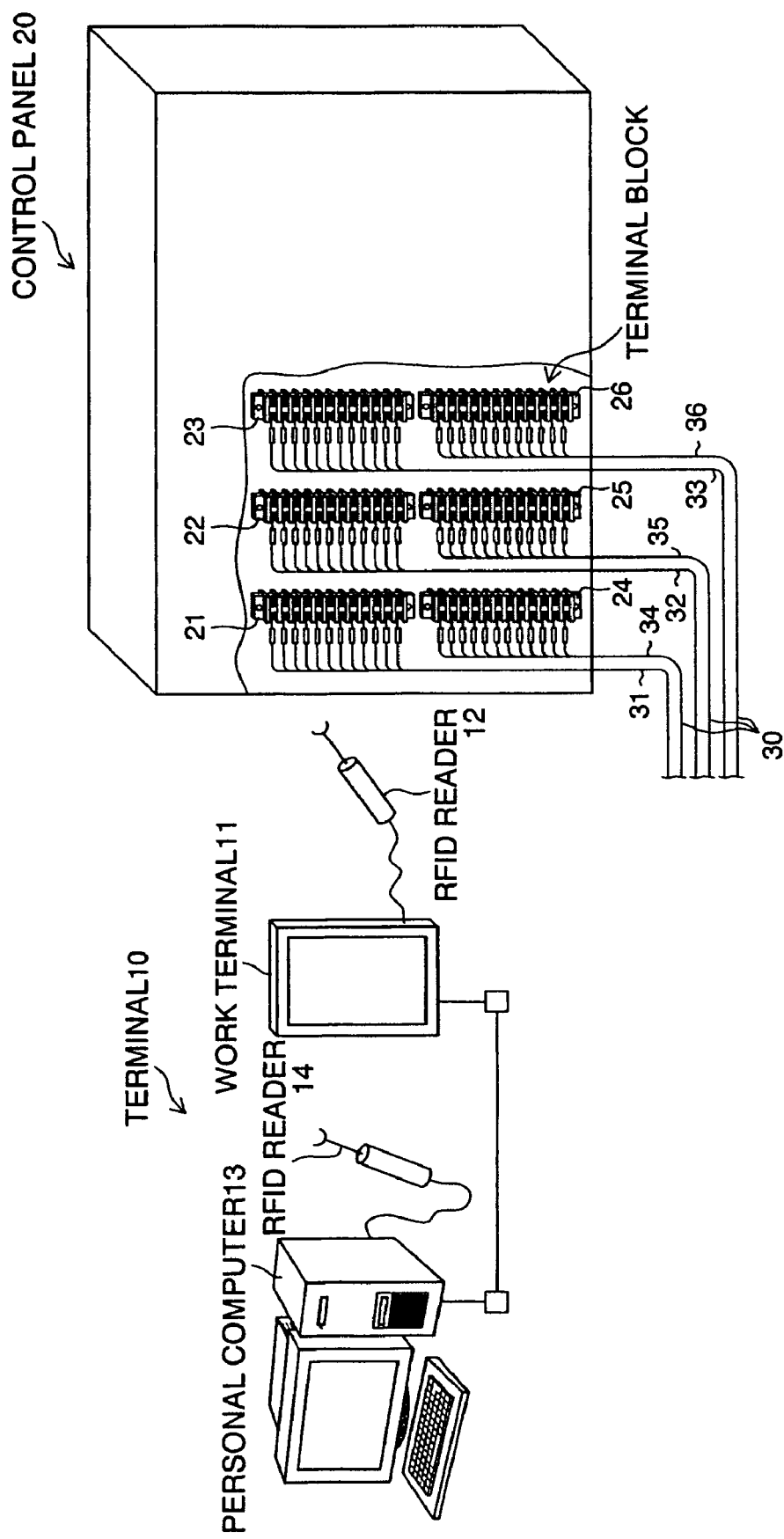
FIG. 1 is an overall configuration diagram of a cable installation support system according to a first embodiment.

FIG. 1 is an overall configuration diagram of a cable installation support management system according to the present invention.

This cable installation support system mainly includes a terminal 10 and a control panel 20. The terminal 10 mainly includes a work terminal 11, RFID readers 12 and 14, and a local office personal computer 13. Also, the control panel 20 includes terminal blocks 21, 22, 23, 24, 25 and 26, and a console (not shown).

The work terminal 11 includes an operating system (OS) for operating as a terminal, device drivers for peripheral devices, a storage device that stores software used for the cable installation support system according to the present invention, a display device such as a liquid-crystal display, a speaker, and an input device such as a touch panel. Also, the RFID reader 12 for reading identification information in RFIDs is connected to a connector or slot in the work terminal 11. Furthermore, the display device includes a detection device for the touch panel, and when the display device is pressed with a finger or a touch pen, etc., it automatically detects the press.

Also, the work terminal 11 manages personal information, etc., on workers, etc., based on authentication information (user ID) for workers or managers, and also manages accomplished-work data for cable installation.

The work terminal 11 incorporates a wireless LAN communication function, and can communicate with the local office personal computer 13 via wireless access points (not shown) provided to the respective floors or respective predetermined areas of the building.

The personal computer 13 includes an operating system (OS) for operating as a terminal, device drivers for peripheral devices, a storage device that stores software used for the cable installation support system according to the present invention and various association information (which will be described later), a display device such as a liquid-crystal display, and an input device such as a keyboard. Also, the RFID reader 14 for reading identification information in RFIDs is connected to a connector or slot in the personal computer 13.

The personal computer 13 outputs information for printing a cable number to a printer (not shown), and makes the printer print the cable number on an RFID cable index, which is a cable identification card to be attached to a cable sheath. An RFID (Radio Frequency Identification) is provided in advance in an RFID cable index, and unique identification information (for example, a manufacturing number unique to the RFID) is recorded in the RFID. An RFID cable index 31a prepared as described above is attached to a cable 31, an RFID cable index is attached to a cable 32, and cables 33-36 have RFID cable indexes in the same manner indicated for cable 31.

The personal computer 13 associates the cable numbers and the cable IDs with each other based on the cable number printing information output from the printer, and unique RFID identification information (cable IDs) included in the RFID cable indexes read by the printer. Also, in the personal computer 13, information in which the cable numbers and the cable IDs are associated with each other, and work information in respective sites, which is managed by cable number, are linked.

Also, in the personal computer 13, information relating to cables (cable information, device information, specifications and cable routes), and information relating to a cable connection drawing (terminal block information, cable information, device information and pattern diagrams), etc. are managed. The cable connection drawing (a cable connection drawing such as an ECWD (elementary control wiring diagram)) is automatically prepared based on a pattern diagram for each local device and the cable information by means of a cable connection drawing automatic preparation program stored in a personal computer provided in the design division. The personal computer or server provided in the design division also manages information for this cable connection drawing, and when, e.g., the cable connection drawing is changed, changes the cable connection drawing managed by the personal computer 13 to a cable connection drawing after the change.

Based on the information relating to the cable connection drawing, the personal computer 13 outputs print information for cable core wires (hereinafter referred to as "cable wire(s)") (e.g., circuit numbers) to the printer, and makes the printer print the circuit numbers on core wire identification RFID tags to be attached to ends of the respective core wires. An RFID is provided in advance in each RFID tag, and unique identification information is recorded in the RFID.

Based on the circuit numbers output from the printer and the unique RFID identification information (core wire IDs) provided in the RFID tags read by the RFID reader 14, the personal computer 13 associates the core wires and the core wire IDs with each other. Also, in the personal computer 13, information in which the core wires and the core wire IDs are associated with each other and work information in respective sites, which is managed by core wire, are linked.

The console is provided with the terminal blocks 21, 22, 23, 24, 25 and 26. In a normal situation, a plurality of cables are connected to each terminal block, but in the present embodiment, for the sake of simplicity, a description is provided assuming that one cable is connected to each terminal block. The cable 31 is connected to the terminal block 21, the cable 32 is connected to the terminal block 22, the cable 33 is connected to the terminal block 23, the cable 34 is connected to the terminal block 24, the cable 35 is connected to the terminal block 25, and the cable 36 is connected to the terminal block 26. Since the configurations and functions of the terminal blocks 21 to 26 are the same, the description of the terminal blocks 22 to 26 will be omitted.

Figure 2:
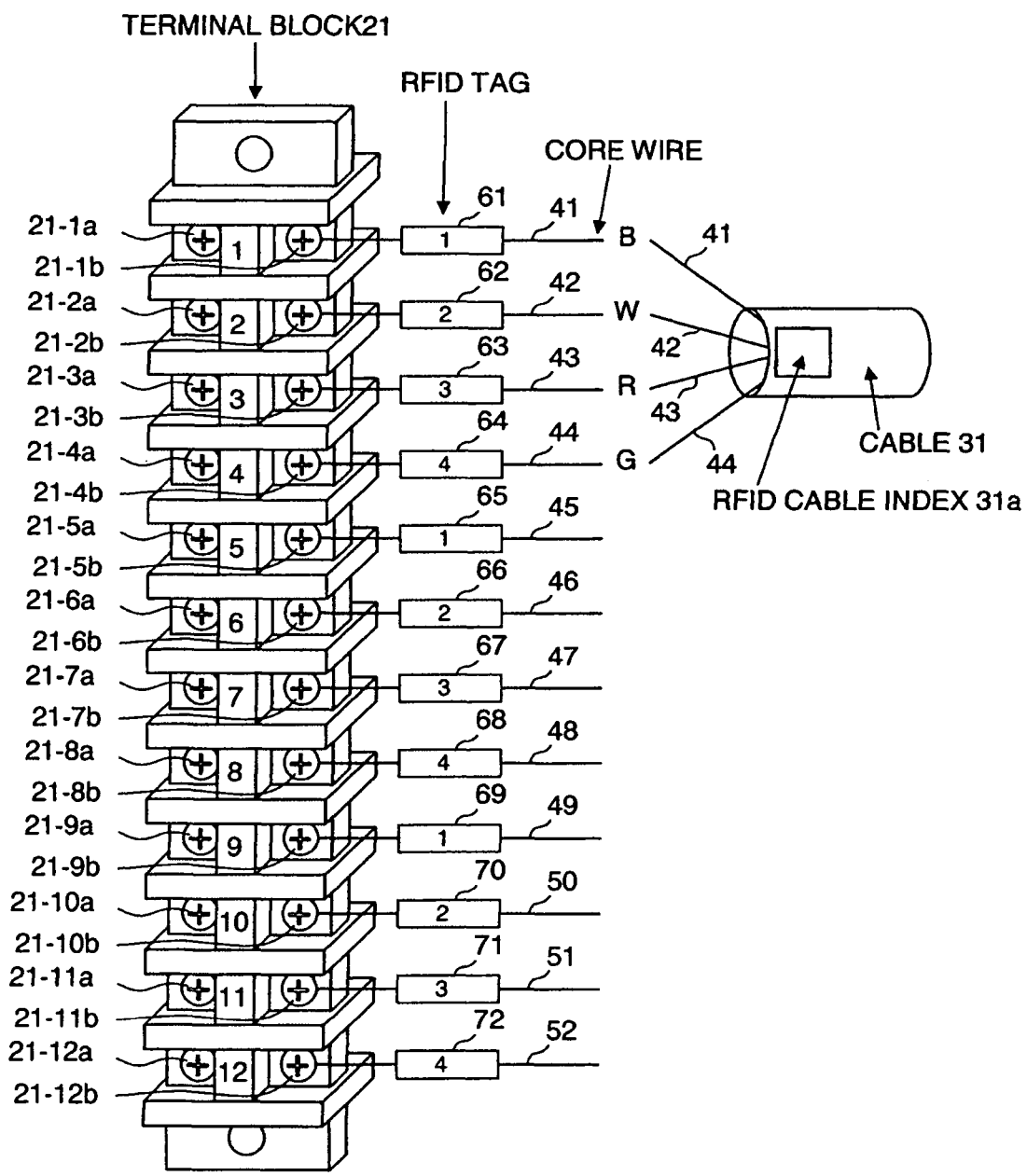
FIG. 2 is a diagram used to describe a terminal block to which respective core wires of a cable are connected and a manner in which the core wires are connected to the terminal block in the first embodiment.
Figure 3:
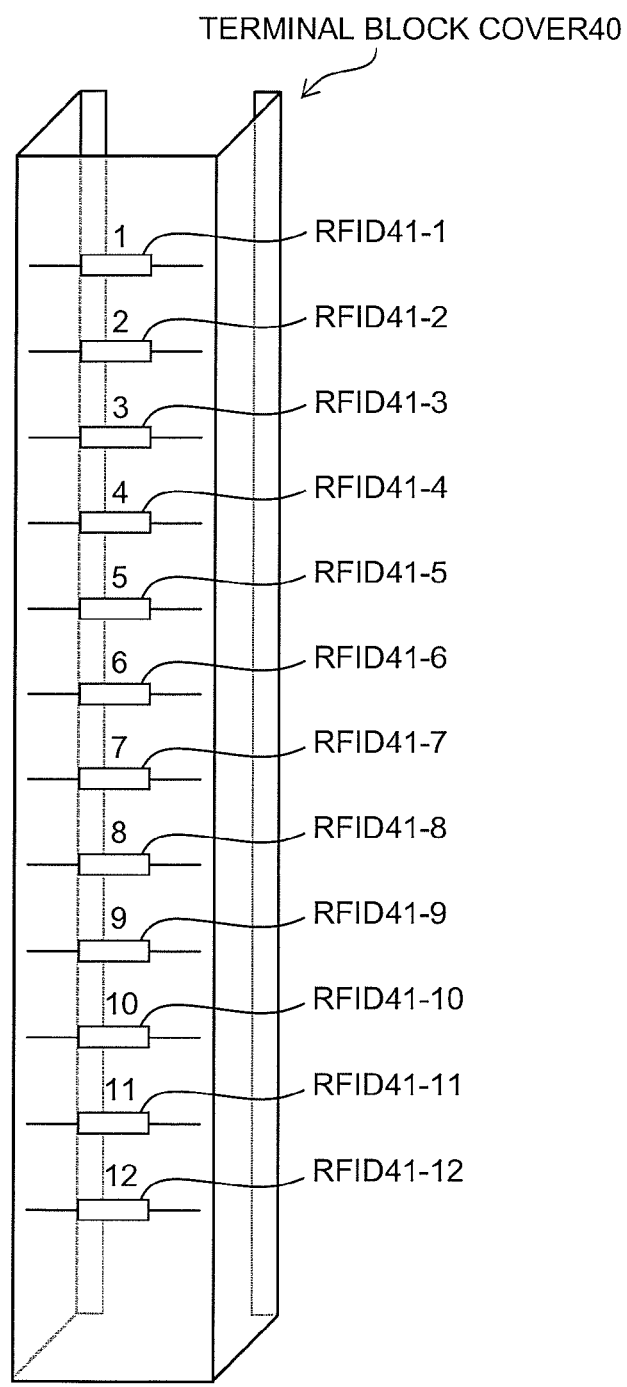
FIG. 3 is an overview of a terminal block plate, to which RFIDs are attached, according to the first embodiment.
Figure 4A:
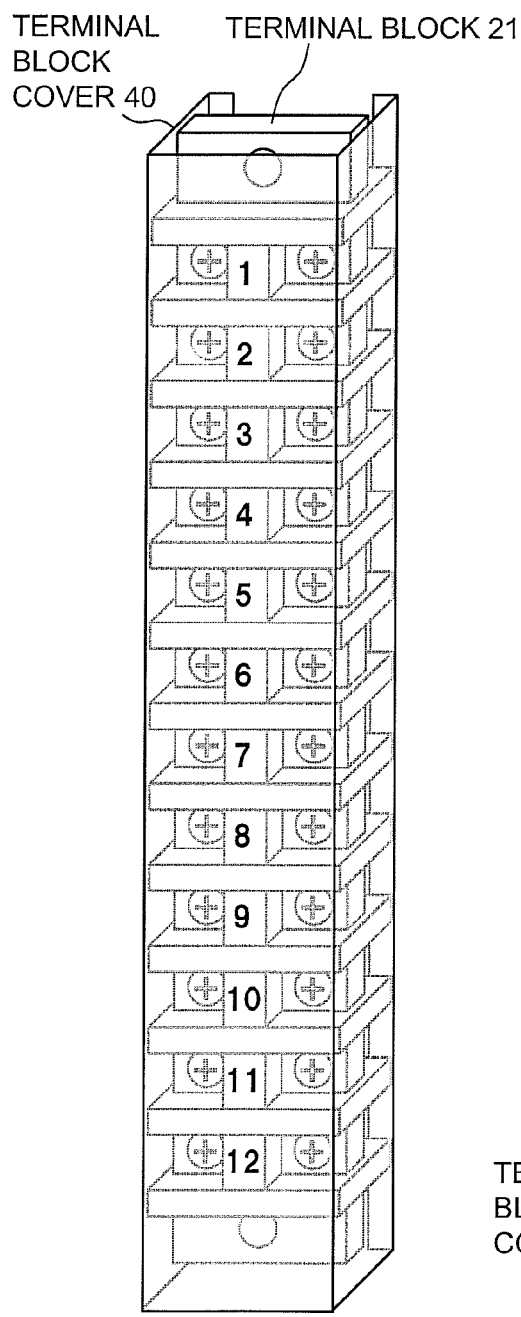
FIGS. 4A and 4B are diagrams used to describe a manner in which the terminal block plate is attached to the terminal block.
Figure 4B:
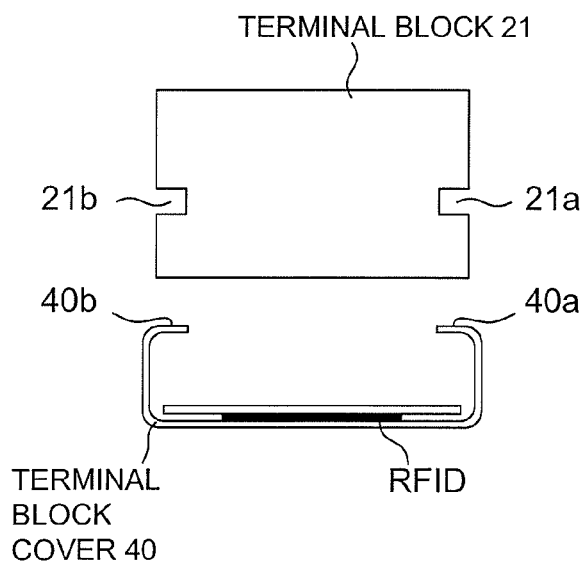

FIG. 2 illustrates an overview of a terminal block, and FIG. 3 illustrates an overview of a terminal block plate. Also, FIGS. 4A and 4B illustrate an overview when a terminal block plate is attached to a terminal block: FIG. 4A is a front view; and FIG. 4B is a top view. The terminal block and terminal block plate illustrated in FIGS. 2 to 4 are a mere example, and the number and positions of terminals, etc., are not limited to those in this example.

The terminal block 21 is provided with two columns of a plurality of terminals, and each column is provided with twelve terminals with a predetermined pitch. The terminals in one of the columns are connected to devices inside the console via a cable (not shown), and the terminals in the other column are connected to measuring instruments, and devices as a result of being connected to the core wires of the cable 31. Hereinafter, a description will be provided assuming that terminals 1b to 12b in the right column are respectively connected to the core wires of the cable 31.

Core wires 41 to 52 of the cable 31, which have been subjected to end processing, are connected to the terminals 21-1b to 21-12b in the right column of the terminal block 21. RFID tags 61 to 72 are attached to the ends of the core wires 41 to 52 connected to the terminal block 21.

A terminal block plate 40 is a substantially U-shaped member formed of transparent plastic material, and even when the terminal block plate 40 is attached to the terminal block 21, the terminals of the terminal block 21 and connection/non-connection of the core wires to the terminals, etc., can be seen through. Twelve RFIDs 41-1 to 41-12 are attached to the terminal block plate 40 with the same pitch as the longitudinal pitch of the terminals of the terminal block 21. The RFID attachment, as shown in FIG. 4B, is performed by inserting the RFIDs between resins of the terminal block plate 40.

Upon putting the terminal block plate 40 on the terminal block 21 with pressure from the front surface of the terminal block 21, hooks 40a and 40b of the terminal block plate 40 fit in recesses 21a and 21b of the terminal block 21, respectively, thereby attaching the terminal block plate 40 to the terminal block 21. The RFIDs 41-1 to 41-12 in the terminal block plate 40 correspond to the terminals 21-1a to 21-12a and 21-1b to 21-12b of the terminal block 21, respectively in such a manner that the RFID 41-1 provided in the top row of the terminal block plate 40 corresponds to the terminals 21-1a and 21-1b in the top row of the terminal block 21, the RFID 41-2 corresponds to the terminals 21-2a and 21-2b, the RFID 41-3 corresponds the terminals 21-3a and 21-3b . . . .

<Associations Between Identification Information in the RFIDs Attached to the Core Wires and Identification Information in the RFIDs Attached to the Terminal Block Plate>

Associations between the identification information (core wire IDs) in the RFIDs attached to the core wires and the identification information (terminal IDs) in the RFIDs attached to the terminal block plate will be described. In the present embodiment, the circuit numbers and the core wire IDs are associated with each other, and the terminal IDs and the terminals are associated with each other. Then, the core wire IDs and the terminal IDs are associated with each other from core wire information obtained from the circuit numbers and core wire information obtained from the terminals. However, the method for associating the core wire IDs and the terminal IDs with each other is not limited to this and various methods can be employed.

[Associations Between the RFID Manufacturing Numbers and the Cable Information]

As shown in FIG. 5A, when a cable number for one cable is input to the printer from the personal computer 13 installed in the local office, the printer prints out two RFID cable indexes each including an RFID with unique identification information (ID unique to the RFID) recorded therein.

The ID unique to the RFID, which is included in the RFID cable index is, e.g., an RFID manufacturing number provided at the time of manufacturing, and different IDs are recorded in RFIDs included in two RFID cable indexes issued for each cable.

The printer prints the cable number on the RFID cable indexes, and notifies the personal computer 13 of the IDs unique to the RFIDs (hereinafter referred to as "cable IDs") included in the two RFID cable indexes printed corresponding to the cable number. Also, the cable IDs may be read from the RFID cable indexes by means of the RFID reader 14 connected to the personal computer 13 when each RFID cable index is printed out.

The personal computer 13 associates the cable information (cable number) and the cable IDs recorded in the RFIDs in the two RFID cable indexes printed out corresponding to the cable number, and stores the association in the storage device.

As a result of associating the cable number and the cable IDs with each other in such a manner as described above, various kinds of information relating to the cable, which is associated with the cable number, etc., can be acquired from the personal computer 13 by reading the cable IDs via the RFID reader 12, which will be described later.

When a cable ID included in an RFID cable index is read via the RFID reader 12, the work terminal 11 acquires, from the personal computer 13, work information for cutting a cable corresponding to the cable ID out of a cable drum.

The cable is cut out based on the acquired information, and as shown in FIG. 5B, two RFID cable indexes 31a are attached to both ends of the cable (only one end is shown in FIG. 5B).

[Associations Between the Core Wires and the Core Wire IDs]

The personal computer 13, based on information relating to the cable connection drawing, outputs print information for the core wires (the circuit numbers) to the printer and makes the printer print the circuit numbers on RFID tags for core wire identification to be attached to ends of the respective core wires. As a result, the RFID tags 61 to 72 with the circuit numbers such as 1, 2, 3, 4 . . . printed thereon (see FIG. 2) are output.

Figure 6:
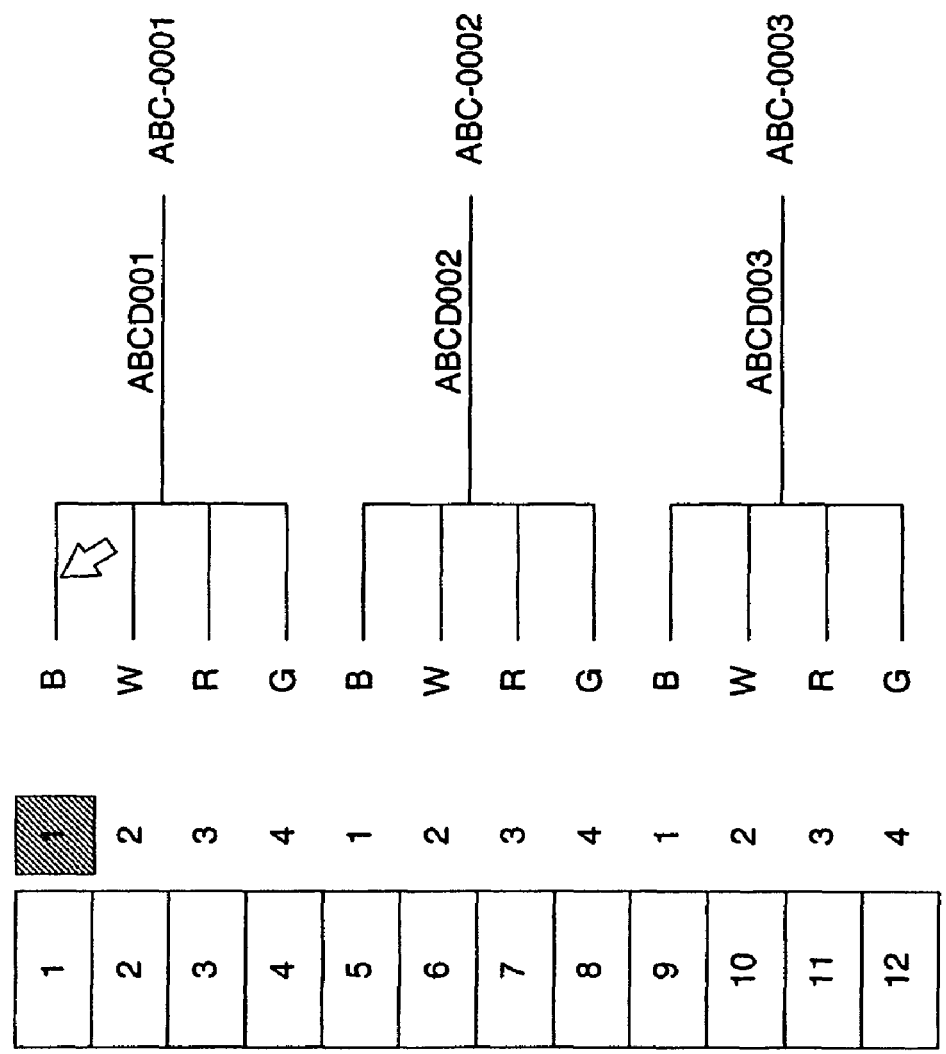
FIG. 6 is a diagram used to describe associations between RFID tags attached to core wires and core wire information.

The personal computer 13 reads information relating to an intended cable from, e.g., information relating to the cables which is managed by the storage device and/or information relating to the cable connection drawing, and makes the display device display the information as shown in FIG. 6.

First, the personal computer 13 acquires unique identification information (the core wire ID) in an RFID tag via the RFID reader 14 connected to the personal computer 13. The worker selects an intended core wire from the core wires displayed on the display device, via the input device, and the personal computer 13 obtains the result of the selection. Then, the personal computer 13 associates the core wire ID and information for the selected core wire (the color and number of the core wire, and the cable number of the cable including the core wire) with each other. In other words, when the personal computer 13 acquires the core wire ID for the RFID tag 61 with "1" printed thereon and a core wire "B" of the cable number ABCD001 is selected, the core wire ID for the RFID tag 61 and information for the selected core wire (B of the cable number ABCD001) are associated with each other. The associated information is stored in the storage device in the personal computer 13. Here, "B" indicates a black core wire, "W" indicates a white core wire, "R" indicates a red core wire, and "G" indicates a green core wire, and "1" indicates the number 1, "2" indicates the number 2, and "3" indicates the number 3.

As a result of associating the core wires and the core wire IDs with each other in such a manner as described above, various kinds of information relating to a core wire, which is associated with the core wire, and various kinds of information relating to the cable including the core wire can be acquired from the personal computer 13 by reading the core wire ID via the RFID reader 12, which will be described later.

[Associations Between Terminal IDs and Terminals]

The personal computer 13 reads information for an intended cable from, e.g., information relating to the cables, which is managed by the storage device, and information relating to the cable connection drawing, and makes the display device display the information as shown in FIG. 6.

First, the personal computer 13 acquires identification information (terminal IDs) unique to the RFID 41-1 to 41-12 attached to the terminal block plate 40, via the RFID reader 14 connected to the personal computer 13. The operator selects terminals corresponding to the RFIDs from the terminal blocks displayed on the display device, via the input device, and the personal computer 13 acquires the result of the selection. Then, the personal computer 13 associates the terminal IDs and the selected terminals with each other. In other words, the operator acquires the terminal ID for the RFID 41-1 attached to the top row of the terminal block plate 40, and then, in the display screen shown in FIG. 6, selects the terminal 1 in the top row of the terminal block 21, thereby associating the terminal ID for the RFID 41-1 and terminals 21-1a and 21-1*b* with each other in the personal computer 13. The associated information is stored in the storage device in the personal computer 13.

As a result of associating the terminal IDs and the terminals with each other in such a manner as described above, information relating to a terminal (various kinds of information relating to the core wire connected to the terminal, and the cable) can be acquired from the personal computer 13 by reading the terminal ID via the RFID reader 12, which will be described later.

<Flow of Cable Installation>

Figure 7:
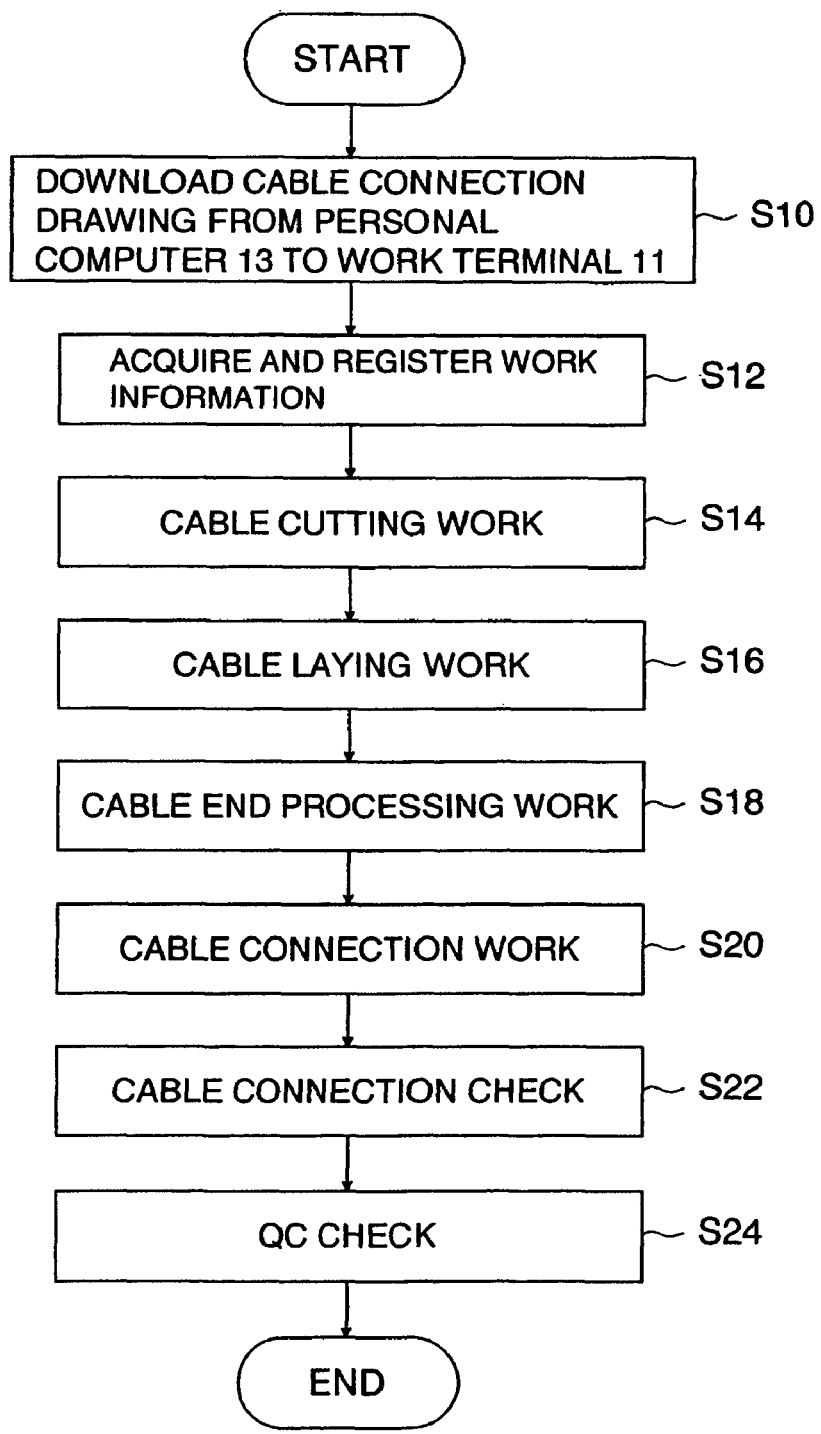
FIG. 7 is a flowchart illustrating the overall flow of cable installation according to the first embodiment.

FIG. 7 is a flowchart illustrating the flow of respective work in a cable installation support system according to the present invention, and the content of respective work, etc., will be described with reference to FIGS. 8 to 17.

[Downloading of the Cable Connection Drawing (Step S10)]

The personal computer 13 and the respective workers' work terminals 11 are connected via a wireless LAN and a dedicated line, and the work terminal 11 downloads, from the personal computer 13, work information supporting work on a cable for which work is allowed, the work information being associated with cable IDs in advance.

Figure 8:
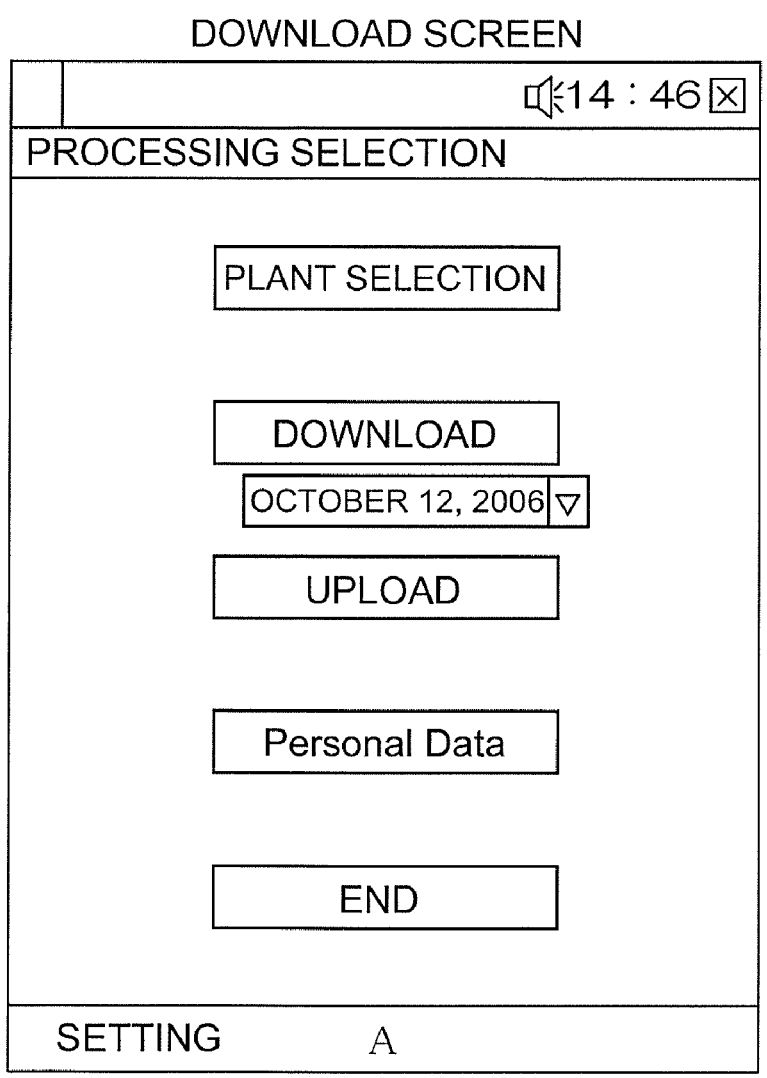
FIG. 8 is a diagram illustrating a download screen displayed on a work terminal 11.

FIG. 8 is a download screen displayed on the work terminal 11. As shown in the Figure, in the work terminal 11, software installed for a cable installation management system is activated and a menu item for downloading is selected, thereby displaying a download screen on the display device of the work terminal 11.

At the time of downloading, the worker inputs a plant selection, the date and a user ID to the work terminal 11. The user ID is input by reading an RFID tag included in an authentication card (e.g., a name plate), which is provided for each worker, via the RFID reader 12 connected to the work terminal 11.

Then, when pressing a software button for downloading, a download request is sent to the personal computer 13 via, e.g., the wireless LAN together with the plant name, the date and the user ID. Upon authenticating the worker from the user ID based on the information managed by the storage device and determining that the worker has the right of access, the personal computer 13 searches for cables for which work is allowed by the design division on the input date, and sends work information for the searched work-allowed cables to the work terminal 11. The work terminal 11 stores the work information downloaded as described above in the storage device in the work terminal 11.

On the download screen, a software button for uploading is also displayed, and upon this button being pressed, various accomplished-work data stored in the work terminal 11 are uploaded to the personal computer 13.

[Work Information Acquisition (step S12)]

Figure 9:
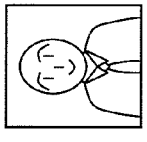
FIG. 9 is a diagram illustrating a screen of the work terminal 11 for acquiring work information.

FIG. 9 shows a screen of the work terminal 11 for acquiring work information. The worker selects any of cable cutting work, cable laying work, cable end processing work and cable connection work on the work terminal 11 to make the screen for the settings of the intended work be displayed on the work terminal 11. FIG. 9 shows a screen for making the settings for cable cutting work.

Subsequently, upon the worker inputting the user ID and the cable ID to the work terminal 11 and pressing an OK button, the work terminal 11 reads out work information for cable cutting work relating to a cable for which work is actually conducted from a list of downloaded and stored work information. This read-out work information is displayed on the display device of the work terminal 11. As a result, it becomes possible to give work instructions to and support the work for the worker.

Here, the user ID is inputted by reading the RFID tag included in the user's authentication card via the RFID reader 12, and the cable ID is inputted by reading the RFID tag included in the RFID cable index 31*a* (see FIG. 5B) via the RFID reader 12.

This operation of the terminal for acquiring work information is performed before each of cable cutting work, cable laying work, cable end processing work and cable connection work, and the operation is an operation common to all of such work.

[Cable Cutting Work (Step S14)]

FIGS. 10A and 10B show a cable cutting work screen displayed on the work terminal 11. As described above, the worker acquires work information for cable cutting work, and makes the work terminal 11 display a cable cutting work screen.

The cable cutting work screen shown in FIG. 10A displays cable information (cable number, designed length, wire type and specification code) used for cutting work based on the acquired work information. The worker selects a cable drum on which a cable to be cut out is wound with reference to this cable information, and cuts a cable with the designed length out of this cable drum.

Upon completion of this cutting work, as shown in FIG. 10B, a software keyboard is displayed on the work terminal 11 to input items indicating the results of the cutting work (the drum number of the cable drum, the length, the length marks (length marks for start and end) and the date of cutting). On an unused cable drum, for example, a cable of 2000 m is wound, and the cable is provided with a length mark for every one meter. In this embodiment, 215 is input as the length mark for start, and 70 is input as the length mark for end. Consequently, it can be understood that: a cable of 145 m (=215−70) is cut out of the cable drum; and that the length of the remaining cable on the cable drum is 70 m.

Upon pressing a "register" button after inputting the aforementioned input items, the user ID, the cable ID and the date of registration, etc., are stored in the storage device in the work terminal 11 together with the input items for cutting work.

Also, an RFID cable index 31*a* is attached to each of both ends of the cable cut out as described above.

[Cable Laying Work (Step S16)]

FIGS. 11A and 11B show a cable laying work screen displayed on the work terminal 11. The worker selects cable laying work, and acquires work information for cable laying work by making an RFID cable index 31*a* attached to the cable be read via the RFID reader 12 of the work terminal 11 and making the user ID from the authentication card be read via the RFID reader 12 of the work terminal 11, and displays a cable laying work screen on the work terminal 11.

In the cable laying work screen shown in FIG. 11A, cable information used for laying work (the cable number, the designed length, the wire type, the number of core wires and the specification code) are indicated based on the acquired work information, and in the cable laying work screen shown in FIG. 11B (the screen on the next page), route information for laying the cable (for example, a list of cable tray numbers of cable trays (cable racks)) is indicated.

The worker lays the cable along the cable trays and cable racks in the building with reference to this route information.

Upon the completion of this laying work, the work presses the "register" button on the cable laying work screen in FIG. 11A to store the user ID, the cable ID and the date of registration, etc., in the storage device in the work terminal 11 together with the laying work information.

[Cable End Processing Work (Step S18)]

The worker makes the cable ID from the RFID cable index 31*a* attached to the cable be read and also makes the user ID from the authentication card be read, via the RFID reader 12 of the work terminal 11. Then, on the work terminal 11, based on the acquired work information for cable end processing work, information for the terminal block to which the cable is connected and the cable connection drawing (see FIG. 6), etc., are indicated. The worker performs cable end processing work with reference to, e.g., the cable connection drawing indicated on the work terminal 11.

Figure 12:
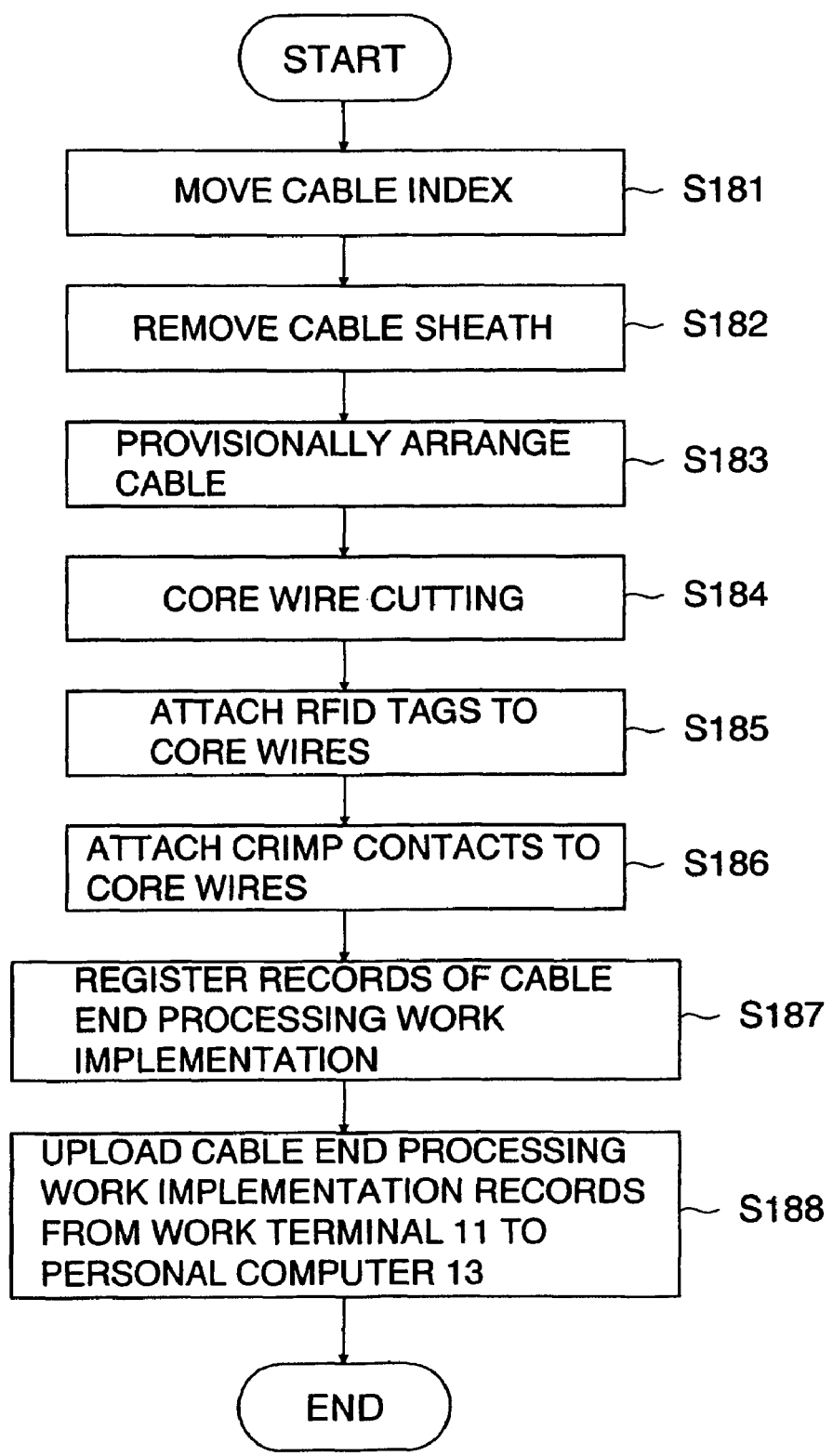
FIG. 12 is a flowchart illustrating the flow of respective work in a cable installation support system according to the first embodiment.

FIG. 12 is a flowchart illustrating the flow of cable end processing work. First, in order to retrieve core wires necessary for end processing, the worker moves the cable index 31*a* (step S181), and removes the cable sheath (cable coating removal) (step S182).

With reference to information for the terminal block to which the cable is connected, the worker provisionally arrange the cable (step S183) and adjusts the lengths of the respective core wires by cutting the core wires (step S184), in order to connect the core wires to the terminals.

The worker confirms the numbers of the respective core wires, and attaches RFID tags corresponding to the numbers, which have been prepared and associated with the core wires at a preparation stage, to the respective core wires (step S185), and attaches crimp contacts to the ends of the core wires (step S186). At this time, in the cable end processing, the length of the coating removed and the lengths of the respective core wires, etc., can arbitrarily be adjusted by referring to, e.g., the cable connection drawing.

Upon the completion of this end processing, the worker stores the user ID, the cable ID and the date of registration, etc., in the storage device in the work terminal 11 together with the terminal end processing work information (step S187). As described with reference to FIG. 8, upon the software button for uploading being pressed on the download screen, the work terminal 11 uploads the records of the implementation of the cable end processing work to the personal computer 13 (step S188).

[Cable Connection Work (Step S20)]

The worker selects cable connection work, and acquires work information for cable connection work by making the cable ID be read from the RFID cable index 31*a* attached to the cable again via the RFID reader 12 of the work terminal 11, and displays information for the terminal block to which the cable is connected and the cable connection drawing (see FIG. 6) on the work terminal 11 based on this work information. In the cable connection drawing shown in FIG. 6, "B", "W", "R" and "G" indicated corresponding to the core wires of the cable denote the colors of the core wires (black, white, red and green), and the numbers are numbers provided to the core wires.

Figure 13:
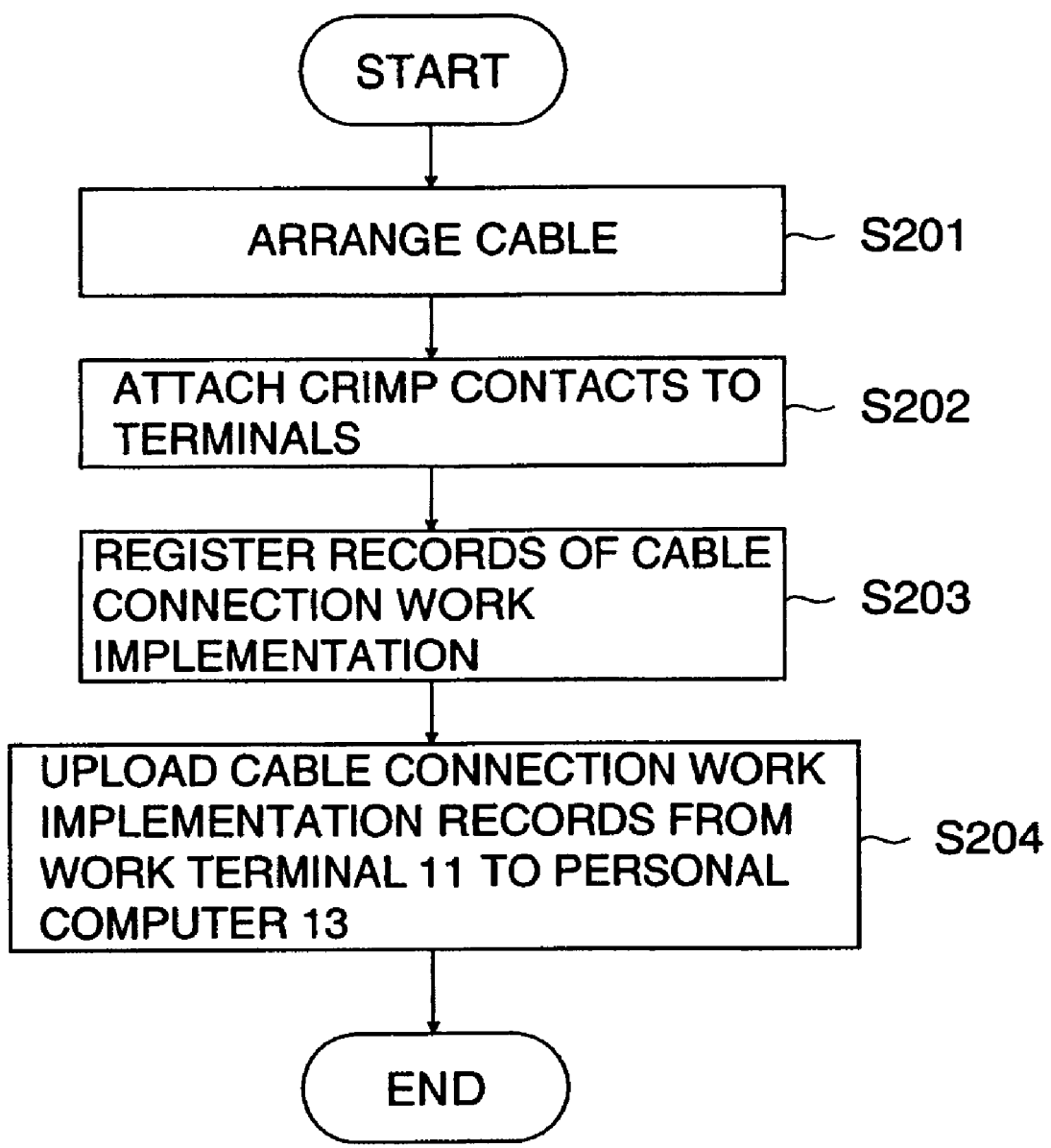
FIG. 13 is a flowchart illustrating the flow of respective work in a cable installation support system according to the first embodiment.

FIG. 13 is a flowchart illustrating the flow of cable connection work. First, the worker formally arranges the core wires provisionally arranged in the cable end processing (step S183) (step S201), and attaches the crimp contacts attached to the core wires to the terminals (step S202).

Upon the completion of this connection processing, the worker stores the user ID, the cable ID and the date of registration, etc., in the storage device in the work terminal 11 together with the cable connection work information (step S203). As described with reference to FIG. 8, upon the software button for uploading being pressed on the download screen, the work terminal 11 uploads the records of the implementation of the cable connection work to the personal computer 13 (step S204).

The worker can confirm the positions of the control panel and terminal block to which the respective core wires should be connected, by means of the cable connection drawing indicated on the work terminal 11, enabling the cable connection work to be performed correctly.

[Cable Connection Check Work (Step S22)]

Figure 14:
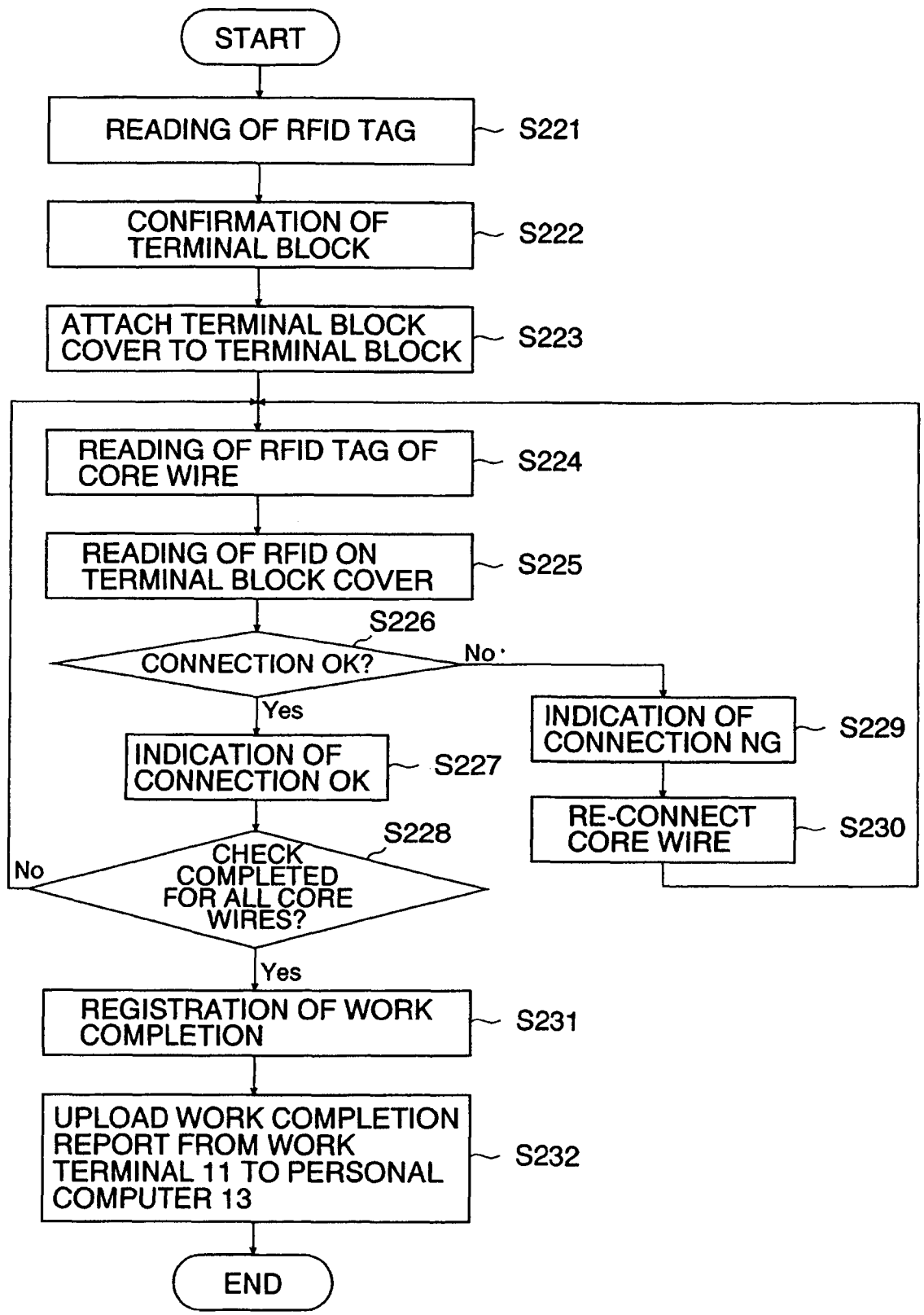
FIG. 14 is a flowchart illustrating the flow of respective work in a cable installation support system according to the first embodiment.

FIG. 14 is a flowchart illustrating the flow of cable connection check work. First, by reading the RFID tag attached to an intended core wire from among the core wires connected to the terminal block which the checker wishes to check, via the RFID reader 12, the work terminal 11 displays information for the terminal block to which the core wire is connected and the cable connection drawing (see FIG. 6) (step S221), and checks whether or not the number of the terminal block displayed on the cable connection drawing, and the number of the terminal block to which the core wire whose core wire ID has been read is actually connected correspond to each other (step S222). If it has been confirmed that the terminal block is the correct one, the worker attaches a terminal block plate to the terminal block (step S223).

The worker makes the RFID tag attached to the core wire be read via the RFID reader 12 (step S224), and also makes the RFID in the terminal block plate corresponding to the terminal to which the core wire is connected be read via the RFID reader 12 (step S225). In other words, at step S224, when the core wire ID of the RFID tag 61 is read, the core wire 41 to which the RFID tag 61 is attached is connected to the terminal 21-1*b*, and accordingly, at step S225, the terminal ID of the RFID 41-1 corresponding to the terminal 21-1*b* is read.

Based on the core wire ID of the RFID tag read at step S224 and the terminal ID of the RFID read at step S225, the work terminal 11 determines whether or not the core wire is connected to the correct terminal (step S226). Here, a method for determining whether or not a core wire is connected to a correct terminal based on the core wire ID and the terminal ID will be described.

Before cable installation shown in FIG. 7, associations between the core wires and the core wire IDs and associations between the terminal IDs and the terminals are made. In the associations between the core wires and the core wire IDs, for example, the core wire ID of the RFID tag 61 on which "1" has been printed and the information, "B of the cable number ABCD001", are associated with each other. Also, in the associations between the terminal IDs and the terminals, for example, the terminal ID of the RFID 41-1, and the terminals 21-1*a* and 21-1*b* are associated with each other.

Also, in the cable connection drawing shown in FIG. 6, information on which terminals the respective core wires are to be connected to is included. In other words, the information, "the core wire indicated by "B of the cable number ABCD001" is connected to the terminal 21-1*b*", is recorded.

Accordingly, the work terminal 11 can obtain, from a core wire ID read by the RFID reader 12, the core wire associated with the core wire ID, and also obtains which terminal the core wire is connected to from the information in the cable connection drawing. Also, the work terminal 11 obtains, from a terminal ID read by the RFID reader 12, information for the terminal associated with the terminal ID. Then, the work terminal 11 compares the terminal information obtained from the core wire ID and the terminal information obtained from the terminal ID with each other, and if such pieces of information correspond to each other, it can be determined that the core wire is connected to the correct terminal, and if such pieces of information do not correspond to each other, it can be determined that the core wire is not connected to the correct terminal. In other words, the work terminal 11 obtains the core wire of "B of the cable number of ABCD001" from the core wire ID of the RFID tag 61, and obtains the terminal 21-1b to which the core wire 41 is to be connected from the core wire of "B of the cable number of ABCD001". Also, the work terminal 11 obtains the terminal 21-1b from the terminal ID of the RFID 41-1. Then, since the terminal 21-1b obtained from the core wire ID and the terminal 21-1b obtained from the terminal ID correspond to each other, the work terminal 11 can determine that the core wire 41 is connected to the correct terminal.

Figure 15:
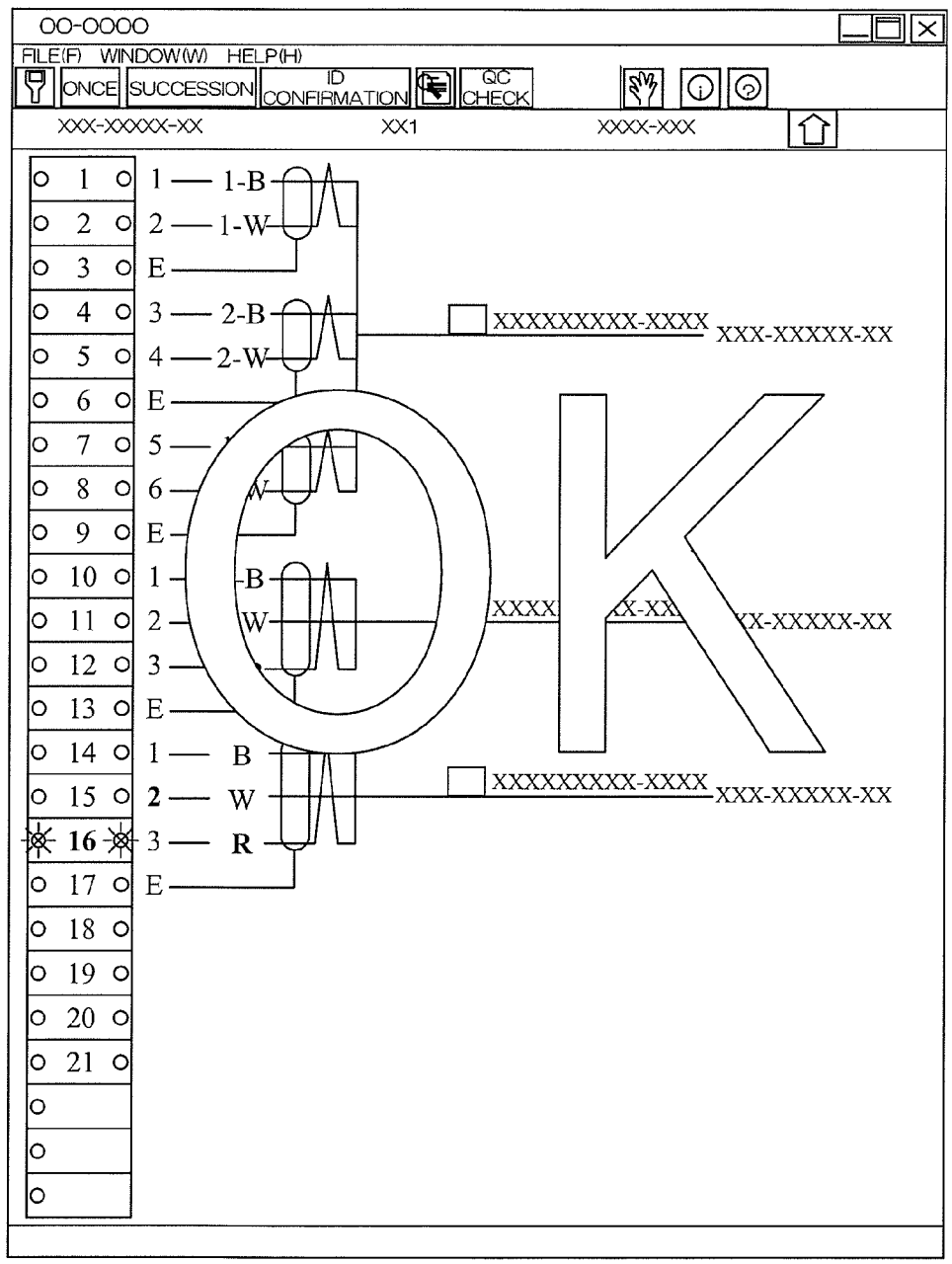
FIG. 15 is a diagram illustrating a connection check screen displayed on the work terminal 11.

If the core wire is connected to the correct terminal (YES at step S226), as shown in FIG. 15, the work terminal 11 displays an indication to show that the connection is correct (characters such as "OK") (step S227). Concurrently, the work terminal 11 highlights the core wire whose core wire ID has been read and the terminal to which the core wire is connected in green in the displayed cable connection drawing. Here, "highlight" refers to indicating the relevant section with emphasis by means of, e.g., illuminating the background with, e.g., a back light or brightening the characters. At step S227, information that the connection is correct is conveyed to the worker by providing an indication to show that the connection is correct on the work terminal 11. However, the present invention is not limited to this, and the information may be conveyed to the worker using voices or sounds, etc.

The work terminal 11 determines whether or not the check has been completed for all the core wires connected to the terminal block (step S228). If the check has not been completed for all the core wires yet (NO at step S228), the worker performs the reading of the RFID tag for the next core wire (step S224).

Figure 16:
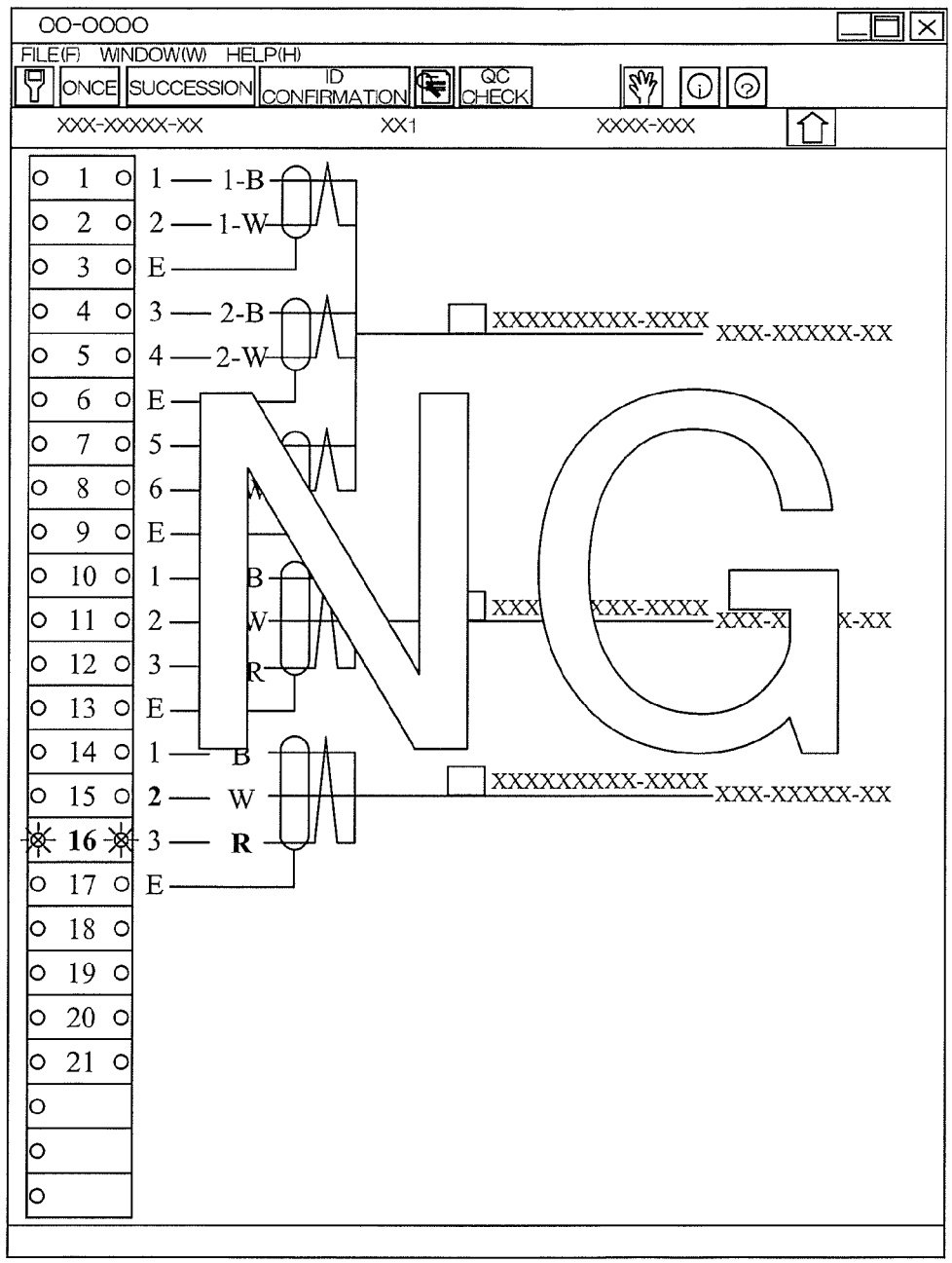
FIG. 16 is a diagram illustrating a connection check screen displayed on the work terminal 11.

If the core wire is not connected to the correct terminal (No at step S226), as shown in FIG. 16, the work terminal 11 displays an indication to show that the connection is not correct (characters such as "NG") (step S229). Concurrently, the work terminal 11 highlights the core wire whose core wire ID has been read and the terminal to which the core wire is connected in red in the displayed cable connection drawing. Then, with reference to a frame indicated in the cable connection drawing, the worker connects the core wire to the correct terminal (step S230) and performs the reading of the RFID tag again (step S224). At step S229, as at step S226, the information may be conveyed to the worker using voices or sounds, etc.

When it has been confirmed that all the core wire connections are correct, the worker stores the user ID, the cable ID, and the date and time of the registration, etc., in the storage device in the work terminal 11 together with the check work information (step S231). As described with reference to FIG. 8, upon the software button for uploading being pressed on the download screen, the work terminal 11 uploads the records of the implementation of the connection check work to the personal computer 13 (step S232).

As a result, the worker can easily check whether or not the core wires are correctly connected. Also, since the worker does not need to read the cable connection drawing, the connections can be checked without human error. Also, when there is an incorrect connection, the correct connection position is indicated, enabling the worker to easily correct the connection between the core wire and the terminal block.

[QC Check (Step S24)]

Upon the completion of the cable connection check work, the same worker subsequently conducts QC (quality control) check.

In other words, the "QC check" button is clicked on the screen of the work terminal 11, as shown in FIG. 17, a QC check screen appears as a pop-up screen.

The worker for the cable connection (checker) conducts QC check while giving check marks in the check boxes for the check items indicated on the QC check screen. Upon the completion of the QC check, the checker presses the "register" button on the QC screen to register the user ID, the cable ID and the date and time of registration, etc., in the storage device in the work terminal 11 together with the cable connection work information and the results of the QC check.

As described with reference to FIG. 8, upon the software button for uploading being pressed on the download screen, the accomplished-work data registered in the storage device in the work terminal 11 (information for the respective work, the user ID, the cable ID and the date and time, etc., of registration, the check results, etc.) is uploaded to the personal computer 13.

According to the present embodiment, it is possible to easily and correctly check whether or not a cable is connected to a correct terminal block. In the present embodiment, connections are checked using RFIDs and accordingly, reliability can be enhanced compared to the case where connections are checked only visually.

Also, according to the present embodiment, whether or not a cable is connected to a designated terminal can automatically be determined by reading the RFID attached to an end of the cable and the RFID in the terminal block plate.

Also, according to the present embodiment, for example, confirmation of information necessary for the respective work and input of accomplished-work data for the respective work can be performed via, e.g., a portable terminal, eliminating the need for a paper, etc., for entering cable connection drawings and/or accomplished work data on the basis of paper.

Although the present embodiment employs a device including a wireless LAN communication function for the work terminal 11, the present invention is not limited to such device, and the work terminal 11 may be connected to a device connected to a network via a cable or a cradle to download/upload necessary information.

Although in the present embodiment, information necessary for work is collectively downloaded from the personal computer 13 to the work terminal 11 and the information is stored in the storage device in the work terminal 11 to read necessary work information out of the storage device by means of selection of work and input of a cable ID and/or a core wire ID, the present invention is not limited to this method, and information necessary for work may be downloaded from the personal computer 13 to the work terminal 11 when respective work is conducted. Also, separately from the personal computer 13, a server, which is connected to the personal computer 13 via, e.g., a LAN, may be installed and various information recorded in the personal computer 13 may be recorded in the server to enable downloading of such information from the server to the work terminal 11.

Figures 18A, 18B, 18C:
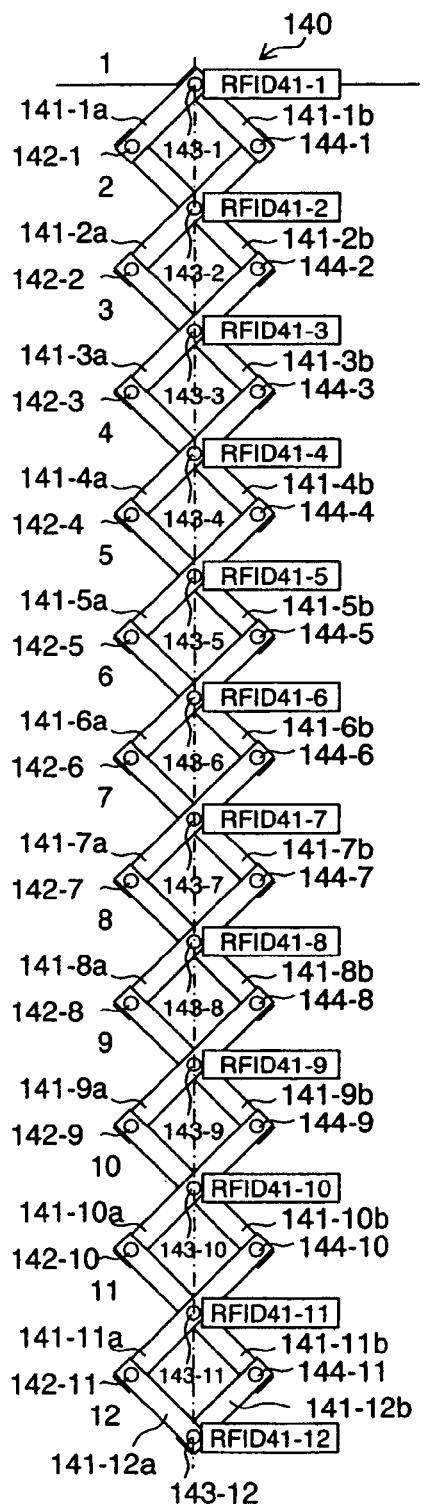
FIGS. 18A, 18B and 18C are overviews of another example of a terminal block plate according to the first embodiment.

Also, although the present embodiment employs the terminal block plate 40 dedicated to the terminal blocks 21 to 26, the use of a terminal block plate 140 that can change the pitch of the RFIDs 41-1 to 41-12 attached to the terminal block plate enables the use of the same terminal block for terminal blocks with different terminal pitches. Hereinafter, the terminal block plate 140 will be described with reference to FIGS. 18A, 18B and 18C. FIG. 18A shows a state in which the RFID pitch is the widest, FIG. 18B shows a state in which the RFID pitch is narrowed (a state between FIGS. 18A and 18C), and FIG. 18C shows a state in which the RFID pitch is the narrowest.

The terminal block plate 140 has a lazy tongs or pantograph-like link mechanism that includes a plurality of plate-shaped members 141-1*a* to 141-12*a* and 141-1*b* to 141-12*b* made of plastic material, and supports 142-1 to 142-11, 143-1 to 143-12 and 144-1 to 144-11 made of plastic material, which connect the plate-shaped members. Also, RFIDs 41-1 to 41-12 are attached to the positions that are substantially the same as the positions of the supports 143-1 to 143-12, respectively.

The members 141-1*a*, 141-1*b*, 141-12*a* and 141-12*b* at the ends are members having a length substantially half the length of the other members 141-2*a* to 141-11*a* and 141-2*b* to 141-11*b*. Also, a hole is provided in each of the vicinities of both ends and substantial centers of the members 141-1*a* to 141-12*a* and 141-1*b* to 141-12*b*. The supports 142-1 to 142-11, 143-1 to 143-12 and 144-1 to 144-11 are members, such as pins, having a diameter smaller than the diameter of the holes formed in the members, and being formed of plastic material. The supports 142-1 to 142-11 and 144-1 to 144-11 are inserted into the holes provided in the vicinities of both ends of the members, and the supports 143-1 to 143-12 are inserted into the holes provided in the substantial centers of the members, thereby rotatably connecting the plurality of members. Consequently, the pitch of the RFIDs 41-1 to 41-12 can arbitrarily be adjusted, and as a result, one terminal block plate can be used for plural types of terminal blocks with different terminal pitches.

A terminal block plate that can change the pitch of RFIDs attached to the terminal block plate is not limited to one having a lazy tongs or pantograph-like link mechanism, and can be configured using various types of mechanisms, such a slide mechanism.

Second Embodiment

Although in the first embodiment of the cable installation support system, in cable connection check work, the worker checks a terminal block to be attached to a terminal block plate based on terminal block information displayed on the work terminal 11, a terminal block to be attached to a terminal block plate can automatically be determined by associating the terminal block and the terminal block plate with each other using RFIDs.

In a second embodiment of the cable installation support system, whether or not a terminal block plate is attached to a correct terminal block is checked by associating the terminal block and the terminal block plate with each other using RFIDs. The same components as those of the first embodiment are provided with the same reference numerals and the description of such components will be omitted.

This cable installation support system mainly includes a terminal 10 and a control panel 20' (not shown). The control panel 20' includes terminal blocks 21', 22', 23', 24', 25' and 26' provided at the front face of a console, and the console. Although not shown, a cable 31 is connected to the terminal block 21', a cable 32 is connected to the terminal block 22', a cable 33 is connected to the terminal block 23', a cable 34 is connected to the terminal block 24', a cable 35 is connected to the terminal block 25', and a cable 36 is connected to the terminal block 26'. Since the configurations and functions of the terminal blocks 21' to 26' are the same, the description of the terminal blocks 22' to 26' will be omitted.

Figure 19:
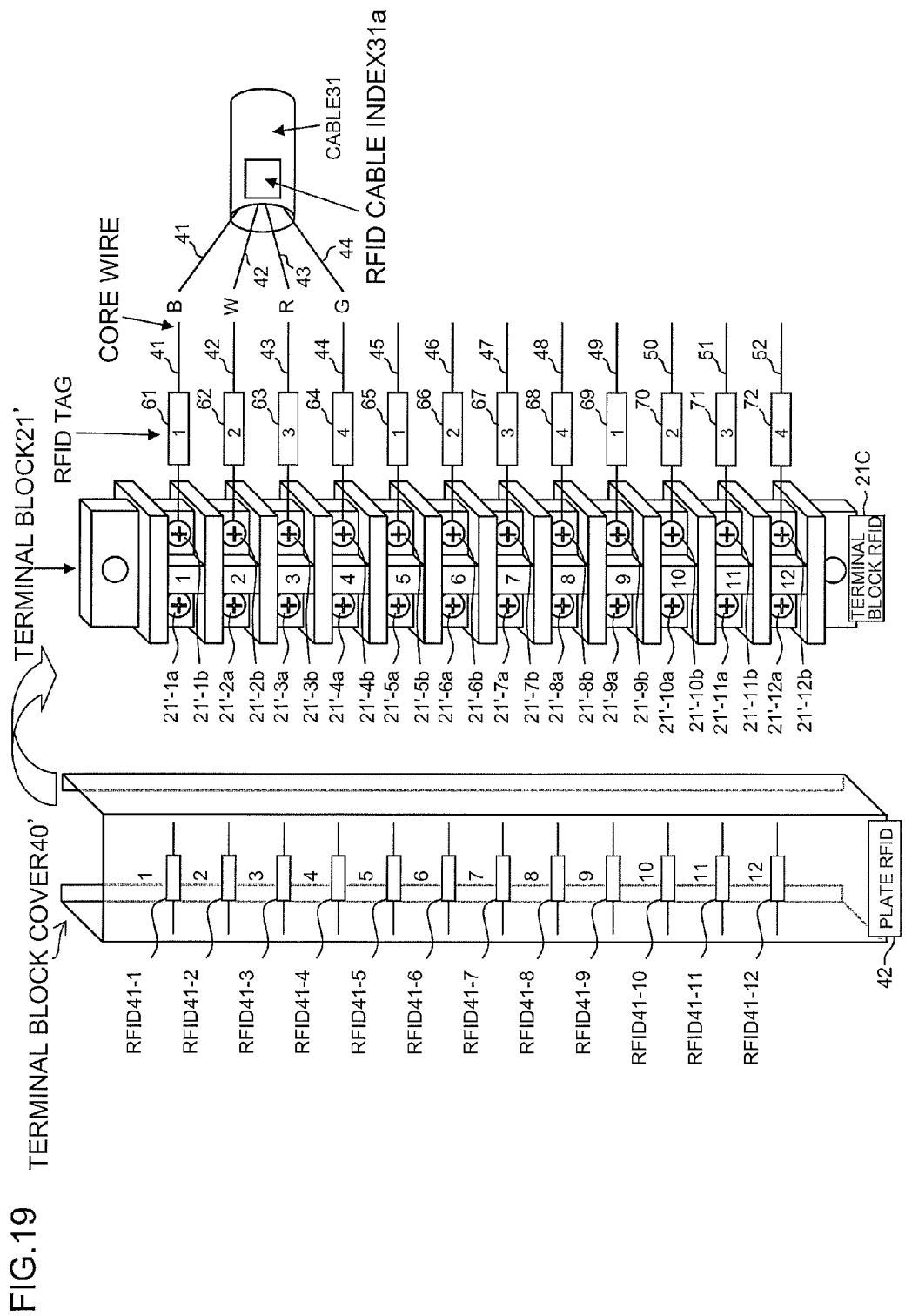
FIG. 19 is a diagram used to describe a terminal block to which respective core wires of a cable are connected, a manner in which the core wires are connected to the terminal block, and a terminal block plate, according to a second embodiment.

As shown in FIG. 19, a terminal block RFID 21*c* is attached to the terminal block 21'. In the terminal block RFID 21*c*, unique identification information (terminal block ID) is recorded. The terminal block 21' is provided two columns of a plurality of terminals, and in each column, and twelve terminals are provided with a predetermined pitch. The terminals in one of the columns are connected to various devices inside the console via a cable (not shown), and the terminals in the other column are connected to measuring instruments, and devices as a result of core wires of the cable 31 being connected to the terminals. Hereinafter, description will be given assuming that the core wires of the cable 31 are connected to terminals 21'-1*b* to 21'-12*b* in the right column.

Core wires 41 to 52, which have been subjected to end processing, are connected to the terminals 21'-1*b* to 21'-12*b* in the right column of the terminal block 21'. RFID tags 61 to 72 are attached to the ends of the core wires 41 to 52 connected to the terminal block 21'.

The terminal block plate 40' is a substantially U-shaped member formed of transparent plastic material, and even when the terminal block plate 40' is attached to the terminal block 21', for example, the terminals of the terminal block 21' and connections/non-connections of the core wires to the terminals can be seen through. Twelve RFIDs 41-1 to 41-12 are attached to the terminal block plate 40' with the same pitch as the longitudinal pitch of the terminals of the terminal block 21'. The RFIDs 41-1 to 41-12 in the terminal block plate 40' and the terminals 21'-1*a* to 21'-12*a* and 21'-1*b* to 21'-12*b* of the terminal block 21' correspond to each other, respectively in such a manner that the RFID 41-1 attached to the top row of the terminal block plate 40' corresponding to the terminals 21'-1*a* and 21'-1*b* at the top row of the terminal block 21', the RFID 41-2 corresponds to the terminals 21'-2*a* and 21'-2*b*, the RFID 41-3 corresponding to the terminals 21'-3*a* and 21'-3*b*....

Separately from the RFIDs 41-1 to 41-12, a plate RFID 442 is attached to the terminal block plate 40'. In the plate RFID 442, unique identification information (terminal block plate ID) is recorded.

[Associations Between the Terminal IDs and the Terminals]

A personal computer 13 reads information for an intended cable from, e.g., information relating to cables, which is managed by a storage device, and information relating to a cable connection drawing, and makes a display device display the information as shown in FIG. 6.

First, the personal computer 13 acquires unique identification information (terminal IDs) in the RFIDs 41-1 to 41-12 attached to the terminal block plate 40' via an RFID reader 14 connected to the personal computer 13. An operator selects a terminal in the terminal block displayed on the display device, which corresponds to the RFID, via an input device, and the personal computer 13 acquires the result of the selection. Then, the personal computer 13 associates the terminal ID and the selected terminal. In other words, the operator acquires the terminal ID in the RFID 41-1 attached to the top row of the terminal block plate 40', and then, selects the terminal number 1 at the top row of the terminal block 21' on the display screen shown in FIG. 6, thereby associating the terminal ID in the RFID 41-1 and the terminals 21'-1*a* and 21'-1*b* with each other in the personal computer 13. The associated information is stored in the storage device in the personal computer 13.

[Associations Between the Terminal Block IDs and the Terminal Blocks]

Since the terminal blocks 21' to 26' have the same shape, the terminal block plate 40' can be attached to any of the terminal blocks 21' to 26', but in the present embodiment, description will be given assuming that the terminal block plate 40' is used only for the terminal block 21'.

A work terminal 11 reads out information for an intended cable from, e.g., information relating to cables, which is managed by a storage device, and a cable connection drawing, and makes the display device display the information as shown in FIG. 6.

A worker acquires the terminal block ID in the terminal block RFID 21c attached to the terminal block 21' using an RFID reader 12, and selects a terminal block corresponding to the terminal block 21' from among the terminal blocks displayed in the cable connection drawing, via the input device, and the work terminal 11 acquires the result of the selection. Then, the work terminal 11 associates the terminal block ID and the terminal block selected in the cable connection drawing.

[Association Between the Terminal Block Plate ID and the Terminal Block]

The personal computer 13 reads out information for an intended cable from, e.g., information relating to cables, which is managed by the storage device, and the cable connection drawing, and makes the display device display the information as shown in FIG. 6.

First, the personal computer 13 acquires the terminal block plate ID in the plate RFID 42 attached to the terminal block plate 40', via the RFID reader 14 connected to the personal computer 13. The worker selects a terminal block corresponding to the terminal block 21' from among the terminal blocks displayed on the display device, via the input device, and the personal computer 13 acquires the result of the selection. Then, the personal computer 13 associates the terminal block plate ID and the terminal block selected on the cable connection drawing with each other.

<Flow of Cable Installation>

Figure 20:
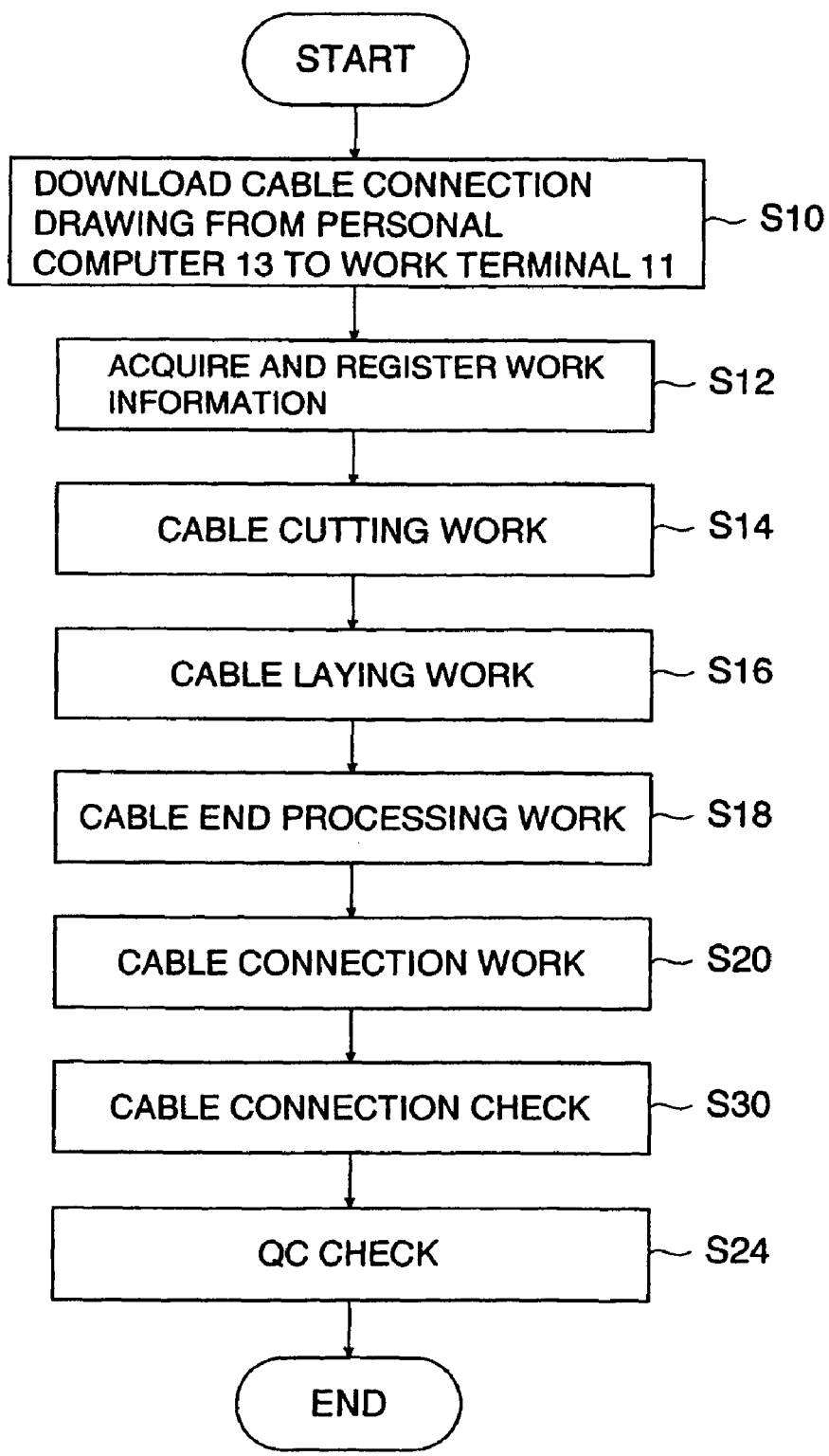
FIG. 20 is a flowchart illustrating the overall flow of cable installation according to the second embodiment.
Figure 21:
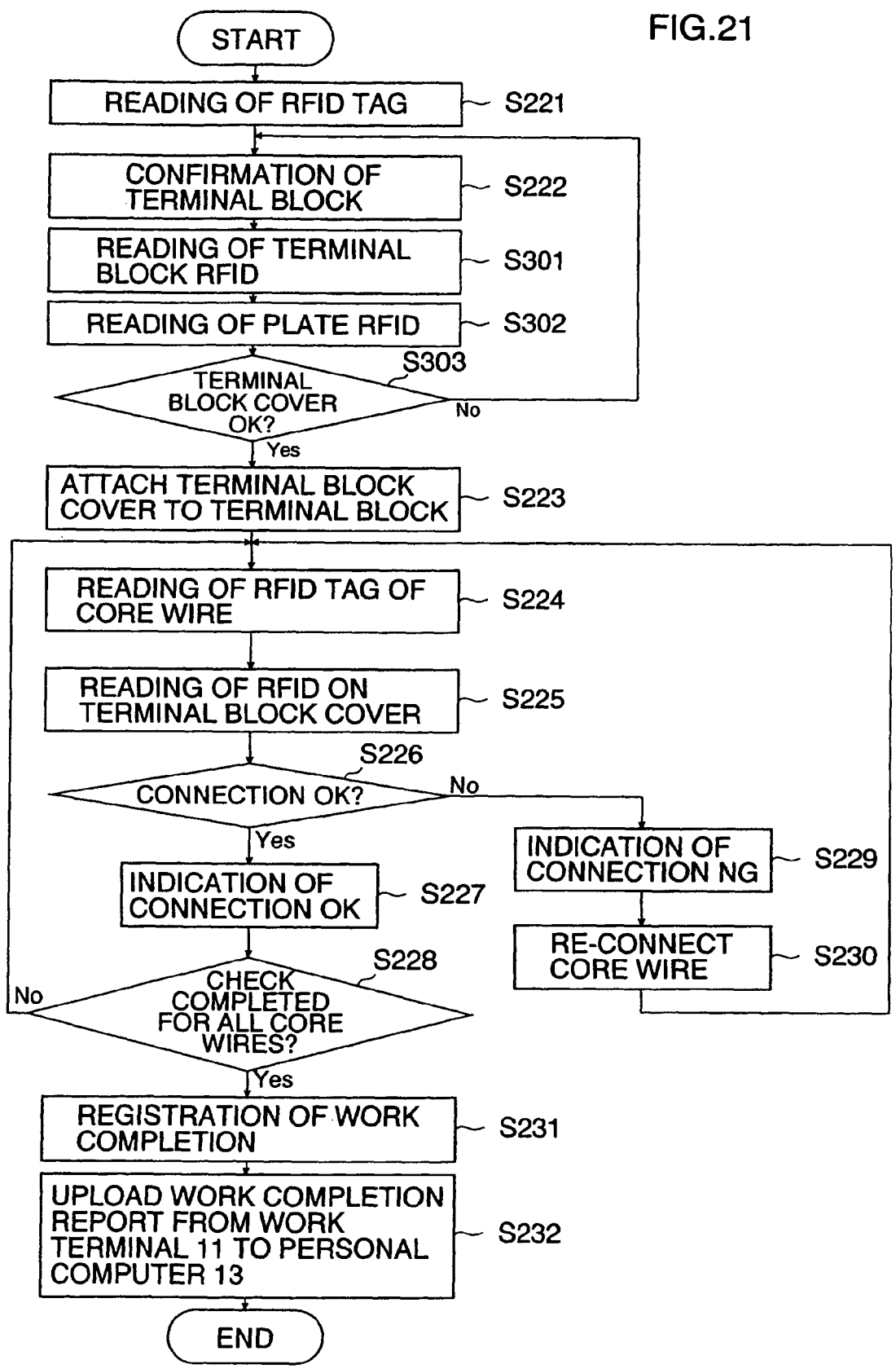
FIG. 21 is a flowchart illustrating the flow of respective work in a cable installation support system according to the second embodiment.

As shown in FIG. 20, the processing is performed in the order of downloading of a cable connection drawing (step S10), work information acquisition (step S12), cable cutting work (step S14), cable laying work (step S16), cable end processing work (step S18), cable connection work (step S20), cable connection check work (step S30) and QC check (step S24). Since the downloading of a cable connection drawing (step S10), the work information acquisition (step S12), the cable cutting work (step S14), the cable laying work (step S16), the cable end processing work (step S18), the cable connection work (step S20) and the QC check (step S24) are the same as in the first embodiment, the cable connection check work (step S30) will be described with reference to FIG. 21.

First, the work terminal 11 reads the RFID tag attached to an intended core wire from among the core wires connected to the terminal block which the worker wishes to check, via the RFID reader 12 of the work terminal 11 to display information on the terminal block to which the core wire is connected and the cable connection drawing (see FIG. 6) (step S221), and checks whether or not the number of the terminal block indicated on the cable connection drawing and the number of the terminal block to which the core wire whose core wire ID has been read is actually connected correspond to each other (step S222).

When it has been confirmed that the terminal block is correct, the worker makes the terminal block ID in the terminal block RFID 21c attached to the terminal block 21' be read via the RFID reader 12 (step S301), and also makes the terminal block plate ID in the plate RFID 42 attached to the terminal block plate 40' be read via the RFID reader 12 (step S302). Then, the work terminal 11 determines whether or not the terminal block plate matches the terminal block, based on the terminal block ID and the terminal block plate ID read via the RFID reader 12 (step S303). Here, a method for the work terminal 11 to determine whether or not a terminal block plate matches a terminal block will be described.

Before cable installation being conducted, terminal block IDs and terminal blocks are associated with each other and terminal block plate IDs and terminal blocks are associated with each other. Accordingly, from a terminal block ID read via the RFID reader 12, the terminal block associated with the terminal block ID can be obtained. Also, from a terminal block plate ID read via the RFID reader 12, the terminal block associated with the terminal block plate ID can be obtained. Then, if these pieces of terminal block information correspond to each other, it can be determined that the terminal block plate matches the terminal block, and if these pieces of terminal block information do not correspond to each other, it can be determined that the terminal block plate does not match the terminal block.

If the terminal block plate matches the terminal block (YES at step S303), the worker attaches the terminal block plate to the terminal block (step S223). If the terminal block plate does not match the terminal block (NO at step S303), the worker checks the number of the terminal block again (step S222).

The worker makes the RFID tag attached to the core wire be read via the reader 12 (step S224), and makes the RFID in the terminal block plate corresponding to the terminal to which the core wire is connected be read via the RFID reader 12 (step S225). In other words, when the core wire ID in the RFID tag 61 is read at step S224, since the core wire 41 to which the RFID tag 61 is attached is connected to the terminal 21'-1b, the terminal ID in the RFID 41-1 corresponding to the terminal 21'-1b is read at step S225.

The work terminal 11 determines whether or not the core wire is connected to the correct terminal based on the core wire ID in the RFID tag read at step S224 and the terminal ID in the RFID read at step S225 (step S226).

If the core wire is connected to the correct terminal (YES at step S226), as shown in FIG. 15, the work terminal 11 displays an indication to show that the connection is correct (characters such as "OK") (step S227). Concurrently, the work terminal 11 highlights the core wire whose core wire ID has been read and the terminal to which the core wire is connected in green in the displayed cable connection drawing.

If the core wire is not connected to the correct terminal (NO at step S226), as shown in FIG. 16, the work terminal 11 displays an indication to show that the connection is not correct (characters such "as NG") (step S229). Concurrently, the work terminal 11 highlights the core wire whose core wire ID has been read and the terminal to which the core wire is connected in red in the displayed cable connection drawing. Then, with reference to a frame displayed in the cable connection drawing, the worker attaches the core wire to the correct terminal (step S230) and makes the RFID tag be read again (step S224).

The work terminal 11 determines whether or not the check has been completed for all the core wires connected to the terminal block (step S228). If check has not completed for all the core wires yet (NO at step S228), the worker performs the reading of the RFID tag for the next core wire (step S224).

If it has been confirmed that all the core wire connections are correct (YES at step S228), the worker stores the user ID, the cable ID, and the date and time of registration, etc., in the storage device in the work terminal 11 together with the check work information (step S231). As described with reference to FIG. 8, upon the software button for uploading being pressed on the download screen, the work terminal 11 uploads the records of the implementation of the cable connection check work to the personal computer 13 (step S232).

As a result, whether or not the terminal block plate matches the terminal block can be confirmed, attachment of the terminal block plate to an unmatched terminal block, and checking cable connections using a terminal block plate not matching the terminal block can be prevented.

Although in the present embodiment, whether or not the terminal block plate matches the terminal block is checked using the terminal block RFID 21c and the plate RFID 42, whether or not the terminal block plate matches the terminal block may be checked using the same RFID as the RFID used for determining whether or not the core wire is connected to the designated terminal, not using the RFID for checking of matching between the terminal block and the terminal block plate.

Third Embodiment

Although the first embodiment and the second embodiment of the cable installation support system employs a terminal block in which two columns of a plurality of terminals are provided, the terminals on one of the columns are connected to the devices inside the console, and the terminals on the other column are connected to the core wires of the cable, the present invention can also be applied to the case where another type of terminal block is employed.

A third embodiment of the cable installation support system employs a terminal block of the type in which core wires are connected to both of two columns of terminals. The same components as those of the first embodiment and the second embodiment are provided with the same reference numerals and the description of such components will be omitted. Various associations such as association between terminal IDs and terminals, and an association between a terminal block plate ID and a terminal block, and the flow of cable installation can be conducted by methods similar to the first embodiment and the second embodiment, and thus the description of such methods will be omitted.

This cable installation support system mainly includes a terminal 10 and a control panel 120 (not shown). The control panel 120 includes terminal blocks 121, 122, 123, 124, 125 and 126 and a console. Although not shown, a cable 31 is connected to the terminal block 121, a cable 32 is connected to the terminal block 122, a cable 33 is connected to the terminal block 123, a cable 34 is connected to the terminal block 124, a cable 35 is connected to the terminal block 125, and a cable 36 is connected to the terminal block 126. Since the configurations and functions of the terminal blocks 121 to 126 are the same, the description of the terminal blocks 122 to 126 will be omitted.

Figure 22:
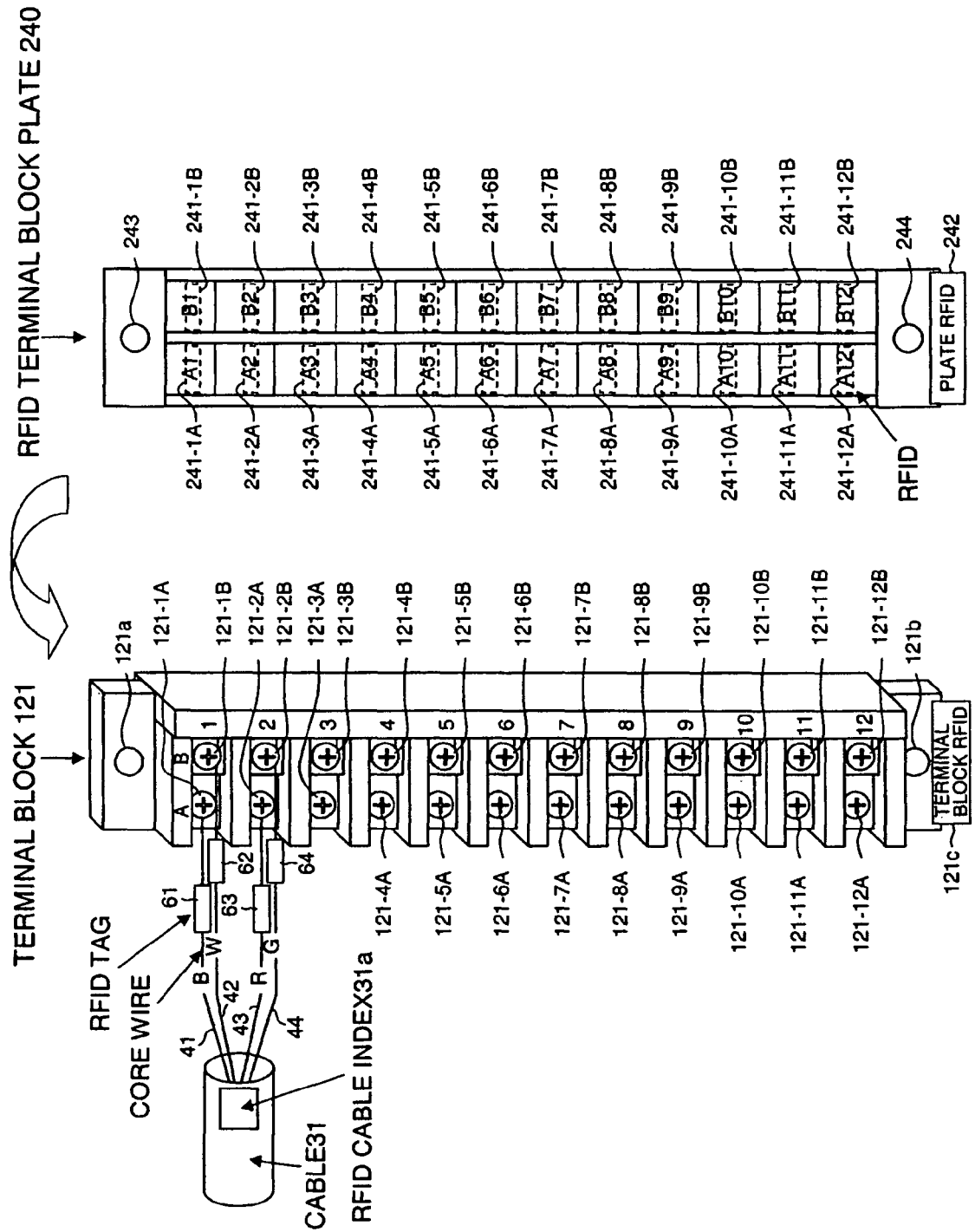
FIG. 22 is a diagram used to describe a terminal block to which respective core wires of a cable are connected, a manner in which the core wires are connected to the terminal block, and a terminal block plate, according to a third embodiment.

As shown in FIG. 22, the terminal block 121 is provided with two columns of a plurality of terminals, the two columns being provided in two different tiers, and in each column, twelve terminals are provided with a predetermined pitch. In other words, in one of the tiers, twelve terminals 121-1A to 121-12A are provided with a predetermined pitch, and in the other tier, twelve terminals 121-1B to 121-12B are provided with a predetermined pitch. The terminals in the columns are connected to core wires of the cable 31, thereby being connected to measuring instruments, and devices. RFID tags 61 to 64 to which RFIDs are attached are attached to the ends of core wires 41 to 44 connected to the terminal block 121.

The terminals and the devices inside the console are connected on the rear surface of the terminal block 121. Also, posts for assembly 121a and 121b, and a terminal block RFID 121c with unique identification information (terminal block ID) recorded therein are attached to the front surface of the terminal block 121.

A terminal block plate 240 is a plate-shaped member formed of transparent plastic material, and holes for assembly 243 and 244 are provided at the upper and lower portions of the terminal block plate 240. Even when the terminal block plate 240 is attached to the terminal block 121, the terminals of the terminal block 121 and connections/non-connections of core wires to the terminals, etc., can be seen through. In the terminal block plate 240, 24 RFIDs are arranged in two columns with the same pitch as the longitudinal pitch of the terminals of the terminal block 121. In other words, RFIDs 241-1A to 241-12A are provided in the left column, corresponding to the terminals 121-1A to 121-12A, and RFIDs 241-1B to 241-12B are provided in the right column, corresponding to the terminals 121-1B to 121-12B.

Also, separately from the RFIDs 241-1A to 241-12A and 241-1B to 241-12B, a plate RFID 242 with unique identification information (terminal block plate ID) recorded therein is attached to the terminal block plate 240.

The post 121a is made to pass through the hole 243 and the post 121b is made to pass through the hole 244, thereby the terminal block plate 240 and the terminal block 121 being assembled. Since the length of the posts 121a and 121b is sufficiently longer than the plate thickness of the terminal block plate 240, the terminal block plate 240 does not come off from the terminal block 121.

According to the present embodiment, the terminals are arranged in two tiers, many core wires can be connected to a small terminal block, and also, the work for attaching the core wires to the terminals can easily be conducted. Also, the present embodiment can be applied to various types of terminal blocks by contriving, e.g., the shape of the terminal block plate.

While the first to the third embodiments have been described in terms of the case where the number of terminals provided in a terminal block and the number of RFIDs attached to a terminal block plate are equal to each other, the present invention can be applied to the case where the number of terminals provided in a terminal block and the number of RFIDs attached to a terminal block plate are different from each other.

Where the number of terminals in a terminal block is smaller than the number of RFIDs in a terminal block plate, for example, where the number of terminals in a terminal block is ten (the first to tenth terminals from the top) and the number of RFIDs in a terminal block plate is twelve (the first to twelfth RFIDs from the top), the first to tenth RFIDs (the ten RFIDs from the top) and the first to tenth terminals may be associated with each other and used without using the two RFIDs from the bottom (the eleventh and twelfth RFIDs) of the terminal block plate.

Where the number of terminals in a terminal block is larger than the number of RFIDs in a terminal block plate, for example, where the number of terminals of a terminal block is twelve (the first to twelfth terminals from the top) and the number of RFIDs in a terminal block plate is ten (the first to tenth RFIDs from the top), first, the first to tenth RFIDs in the terminal block plate are used for the first to tenth terminals of the terminal block, and next, a next terminal block plate is used, and the first and second RFIDs in the next terminal block plate may be used for the eleventh and twelfth terminals after associating the first and second RFIDs and the eleventh and twelfth terminals with each other.

What is claimed is:
1. A cable installation support system, comprising:
   a cable including cable core wires with first RFIDs attached to ends of the respective cable core wires;
   a terminal block plate attachable/detachable to/from a terminal block to which the cable is connected, the terminal block plate being provided with second RFIDs at positions corresponding to respective terminals of the terminal block; and a portable terminal carried by a worker, wherein
the portable terminal includes:
an RFID reader that reads identification information from the first RFIDs and the second RFIDs, respectively;
a determination device that determines, based on identification information read by the RFID reader from the first RFIDs attached to the cable core wires, and identification information read by the RFID reader from the second RFIDs attached to the positions corresponding to the terminal of the terminal block to which the cable core wires are connected, whether or not each of the cable core wires is connected to a corresponding terminal of the terminal block; and
a transmitting device that transmits the result of the determination by the determination device to an operator.

2. The cable installation support system according to claim 1, wherein:
a third RFID is attached to the terminal block;
the RFID reader reads identification information in the third RFID, and identification information in an intended second RFID from among the second RFIDs attached to the terminal block plate; and
the determination device determines whether or not the terminal block plate matches the terminal block, based on the identification information in the third RFID and the second RFID read by the RFID reader.

3. The cable installation support system according to claim 1, wherein:
the portable terminal further includes a storage device that stores information in which the first RFIDs and the second RFIDs are associated with each other; and
the determination device determines whether or not each of the cable core wires are connected to the corresponding terminal of the terminal block, based on the identification information in the first RFIDs and the second RFIDs read by the RFID reader and the information stored in the storage device.

4. A terminal block plate included in the cable installation support system according to claim 1.

5. The terminal block plate according to claim 4, further comprising:
a link mechanism including a plurality of lazy tongs or pantograph members in sequence; and
the second RFIDs attached to a plurality of supports in the link mechanism, wherein
a pitch for the second RFIDs is adjustable to conform to a pitch for the terminals of the terminal block.

6. The terminal block plate according to claim 4, wherein the terminal block plate includes a resin.

7. A cable installation support method, comprising the steps of:
attaching first RFIDs to ends of respective cable core wires of a cable;
connecting the respective cable core wires of the cable to respective terminals of a terminal block;
after the completion of the cable connection, attaching a terminal block plate with second RFIDs to the terminal block, the second RFIDs corresponding one by one to the terminals of the terminal block;
after the attachment of the terminal block plate, reading identification information from the first RFIDs attached to cable core wires and the second RFIDs attached to the terminal block plate corresponding to the first RFIDs, respectively;
based on the read identification information in the first RFIDs and the read identification information in the second RFIDs, determining whether or not each of the cable core wires is connected to a corresponding terminal of the terminal block; and
outputting the result of the determination to an output device.

* * * * *